US006964037B1

(12) United States Patent
Pavlovic et al.

(10) Patent No.: US 6,964,037 B1
(45) Date of Patent: Nov. 8, 2005

(54) METHOD AND APPARATUS FOR DETERMINING COLIMITS OF HEREDITARY DIAGRAMS

(75) Inventors: Dusko Pavlovic, Palo Alto, CA (US); Douglas R. Smith, Mountain View, CA (US); Junbo Liu, Santa Clara, CA (US)

(73) Assignee: Kestrel Institute, Palo Alto, CA (US)

( * ) Notice: Subject to any disclaimer, the term of this patent is extended or adjusted under 35 U.S.C. 154(b) by 593 days.

(21) Appl. No.: 09/665,179

(22) Filed: Sep. 19, 2000

Related U.S. Application Data

(60) Provisional application No. 60/155,271, filed on Sep. 19, 1999.

(51) Int. Cl.[7] .................................................. G06F 9/44
(52) U.S. Cl. ..................... 717/135; 717/108; 717/114; 717/116; 717/124; 717/127; 717/131; 717/137; 706/13; 706/15; 706/44
(58) Field of Search ............................... 703/1, 13, 16; 345/966; 700/86; 717/114, 116, 135, 108, 717/124, 127, 131, 162, 106, 100, 137; 706/44

(56) References Cited

U.S. PATENT DOCUMENTS

| 5,432,942 | A | * | 7/1995 | Trainer ........................ 717/131 |
| 5,485,601 | A | * | 1/1996 | Ching ......................... 717/106 |
| 5,729,747 | A | * | 3/1998 | Tsukakoshi ................. 717/106 |
| 6,405,361 | B1 | * | 6/2002 | Broy et al. .................. 717/104 |

FOREIGN PATENT DOCUMENTS

EP        0 661 631        7/1995

OTHER PUBLICATIONS

Kestrel Development Corporation and Kestrel Institute, "Specware 2.0.3 User's Guide" Mar. 1998.*

Michael Healy "Colimits in Memory: Category Theory and Neural Systems", International Joint Conference on Neural Networks, vol. 1, Jul. 1999 pp. 492-496.*

Dusko Pavlovic, "Towards sematics of self-adaptive software", Dec. 1999, Kestrel Institute Technical Report KES.U.99.4.*

Douglas R. Smith, "Mechanizing the Development of Software", Mar. 1999. Kestrel Institute Technical Report KES.U.99.1.*

Claude Castelluccia et al. , "Generating efficient protocol code from an abstract specification", 1997, IEEE/ACM Transactions on Networking (TON), vol. 5 issue 4, pp. 514-524□□.*

Janos Sztipanovits et al. , "Self-adaptive software for signal processing", May 1998, ACM Press, Communications of the ACM, vol. 41, issue 5, pp. 66-73.*

A. Goldberg et al. , "Specification and development of parallel algorithms with the Proteus system", 1994, AMS Press, DIMACS: Specification of Parallel Algorithms, DIMACS vol. 18, 1994, pp. 383-399.*

R. Radhakrishnan, "An Extensible and Hierarchically Distributed Run-time Control System for Optimistic Discrete-Event Simulators", 1998, Ph. D. Dissertation proposal, Department of Elec. and Comp. Eng. and Comp. Sci., Univ. of Cincinnati, Abstract, Ch. 4.*

(Continued)

Primary Examiner—Anthony Knight
Assistant Examiner—Thomas Pham
(74) Attorney, Agent, or Firm—Fenwick & West LLP

(57) ABSTRACT

A computer-implemented method and system for determining colimits of hereditary diagrams. A user specifies a diagram of diagram and specifies performance of a colimit operation. Once the colimit is performed, the name of the colimit is added to the hereditary diagram. The described embodiment supports diagrams of diagrams, also called hierarchical diagrams.

12 Claims, 44 Drawing Sheets

OTHER PUBLICATIONS

Whalen MW, Heimdahl Mats P.E., "On the requirements of High-Integrity Code Generation", Nov. 199, Proceedings of the 4th High Assurance in Systems Engineering Workshop, Washington DC.*

Englehart, M., "High quality automatic code generation for control applications", 1994, Proceedings, IEEE/IFAC Joint Symposium on, pp. 363-367.*

Jacqueline Floch, "Supporting evolution and maintenance by using a flexible automatic code generator", Apr. 1995, Proceedings of the 17th international conference on Software engineering, pp. 211-219.*

Yellamraju Srinivas et al., "Specware: Formal Support for Composing Software", May 1995, Springer-Verlag, Proceedings of the Conference on Mathematics of Program Construction, pp. 399-422. LNCS 947.*

Prashant, Waknis, et al. "A Graphical Programming Environment for Simulation of Control and Signal Processing Systems" Proceedings of the Southeast Conference, US, New York, IEEE, Apr. 12, 1992, pp. 447-450.

Shepard, T., et al. "A Visual Software Process Language" Communications of the Association for Computing Machinery, US, Association for Computing Machinery, New York, vol. 35, No. 4, Apr. 1, 1992, pp. 37-44.

Pratt, V.; Chu Spaces and their Interpretation as Concurrent Objects; (1995); pp. 1-13.

Pavlovic, D.; Chu I: cofree equivalences, dualities and ★-autonomous categories; Math. Struct. In Comp. Science (1993), vol. 11, pp. 1-24.

Pavlovic, D.; Guarded induction on final coalgebras; (1998); Elsevier Science, B.V., pp. 1-18.

Pavlovic, D. and Escardo, M.H.; Calculus in coinductive form, pp. 1-10.

Jacobs, B.; Coalgebraic Specifications and Models of deterministic Hybrid Systems; Algebraic Methods and Software Technology (1996), pp. 1-17.

Gurevich, Y.; Evolving Algebras 1993: Lipari Guide (1993), pp. 9-36.

Moggi, E.; Notions of computation and monads, pp. 1-29.

Goguen, J. and Burstall, R.; Institutions: Abstract Model Theory for Specification and Programming; Journal of the Association for Computing Machinery (1992), vol. 39, No. 1, pp. 95-146.

* cited by examiner

Spec Software

Spec Software

Example of Using a Colimit to
Combine Refined Specifications

Refining a Specification

Example of Using a Colimit to
Combine Refined Specifications

Refining a Specification

Example Colimit of Specifications

Example Colimit of Diagrams of Diagrams

Example of Taking the Colimit of Hereditary Diagrams

Example user interface showing a hereditary diagram

Example user interface showing a hereditary diagram (interface for user to indicate "find colimit" operation)

Example user interface showing a hereditary diagram after the user indicates a "find colimit" operation for the hereditary diagram and the colimit operation is performed Hereditary diagram Hereditary diagram, including colimit Bag diagram
(obtained by expanding node
Bag-Diagram
in Hereditary diagram)

Bag-Seq-over-Linear-Order diagram
(obtained by expanding node
Bag-Seq-over-Linear-Order-
diagram
in Hereditary diagram)

Shape of colimit

Extended Bag diagram

Extended Bag-as-Sequence diagram

Extended Bag-Seq-over-Linear-Order diagram

Colimit of Hereditary diagrams
(final result)

Finding a Colimit of
Hereditary Diagrams

PART I: Extract the shapes and shape functors to yield a diagram of shape categories A Shape Morphism where d1 and d2 are diagrams,
F is a shape functor,
e is a natural transformation from d1 to
(d2 composed with F)
D1 and D2 are shape categories of
diagrams, and SPEC is the category
Spec A Hereditary Diagram: Three
Diagrams and Two Arcs.

Each arc a1 and a2 represents a
shape morphism having 1) a
shape functor (such as F) and 2)
a natural shape transformation
(such as e: d1 --> d2)

A More Detailed View of Three Diagrams and Two Arcs (a Hereditary Diagram)

More Detailed View of Extracting the Shapes and Shape Functors (continued on Figs. 15(b)-15(d))

Extract the Shapes and Shape Functors
(D1 is shape of diagram d1, F1 is shape functor)

Arcs:  B -> A
       C -> B
Nodes:  i -> IV
        ii -> V
        iii -> IV

Mapping for F2
Fig. 15(c)

Arcs:  B -> b
       C -> c
Nodes:  i -> 1
        ii -> 2
        iii -> 3

Mapping for F1
Fig. 15(b)

| Arc    | B  | C   | a | b | c | d | A  | B  |
|--------|----|-----|---|---|---|---|----|----|
| Source | i  | iii | 1 | 1 | 3 | 3 | IV | IV |
| Target | ii | ii  | 0 | 2 | 2 | 4 | V  | V  |

Source (S) and Target (T) Functions for Hereditary Diagrams
Fig. 15(d)

PART I: Determine the colimit of the diagram of shape categories.

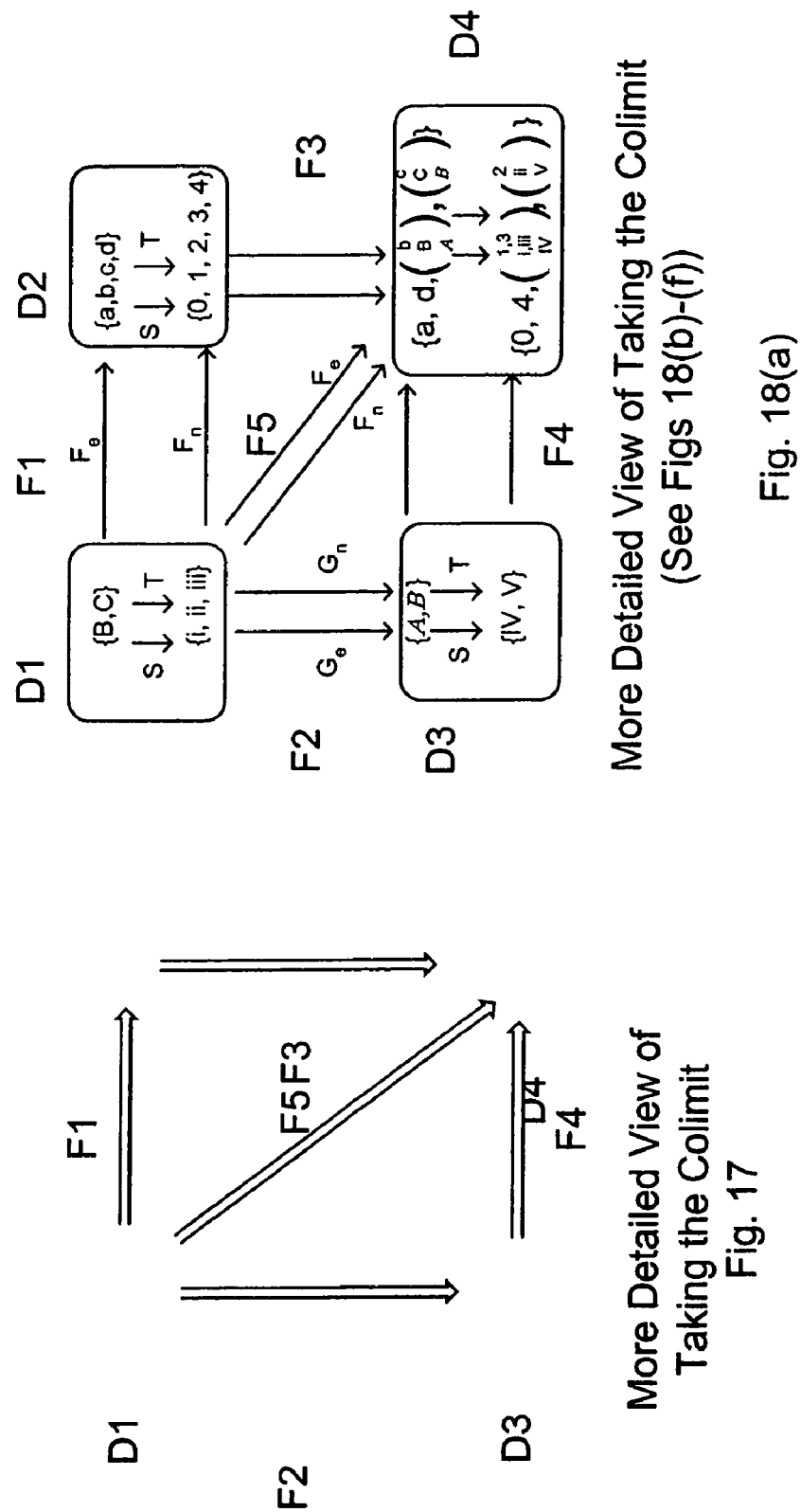

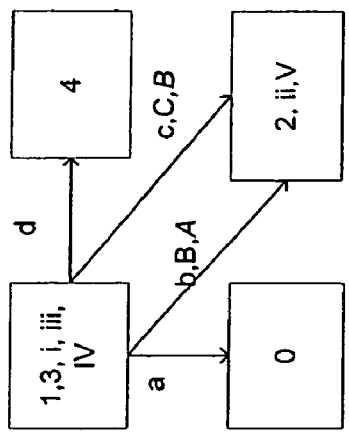

The Colimit D4 of the Shape Diagrams
Fig. 18(c)

| Arc | a | d | b c<br>A C<br>A B |
|---|---|---|---|
| Source | 1,3<br>i,iii<br>IV | 1,3<br>i,iii<br>IV | 1,3 1,3<br>i,iii i,iii<br>IV IV |
| Target | 0 | 4 | 2 2<br>ii ii<br>V V |

Arcs: a -> a
     d -> d
     b -> b,B,A
     c -> c,C,B

Nodes: 0 -> 0
       1 -> 1,3, i, iii, IV
       2 -> 2, ii, V
       3 -> 1,3, i,iii, IV
       4 -> 4

Mapping for F3
Fig. 18(d)

Source (S) and Target (T) Functions for Shape Colimit D4
Fig. 18(b)

Arcs: $A \to b,B,A$
     $B \to c,C,B$

Nodes: IV -> 1,3, i, iii, IV
       V -> 2, ii, V

Mapping for F4
Fig. 18(e)

Arcs: $B \to b,B,A$
     $C \to c,C,B$

Nodes: i -> 1,3, i, iii, IV
       ii -> 2, ii, V
       iii -> 1,3, i, iii, IV

Mapping for F5
Fig. 18(f)

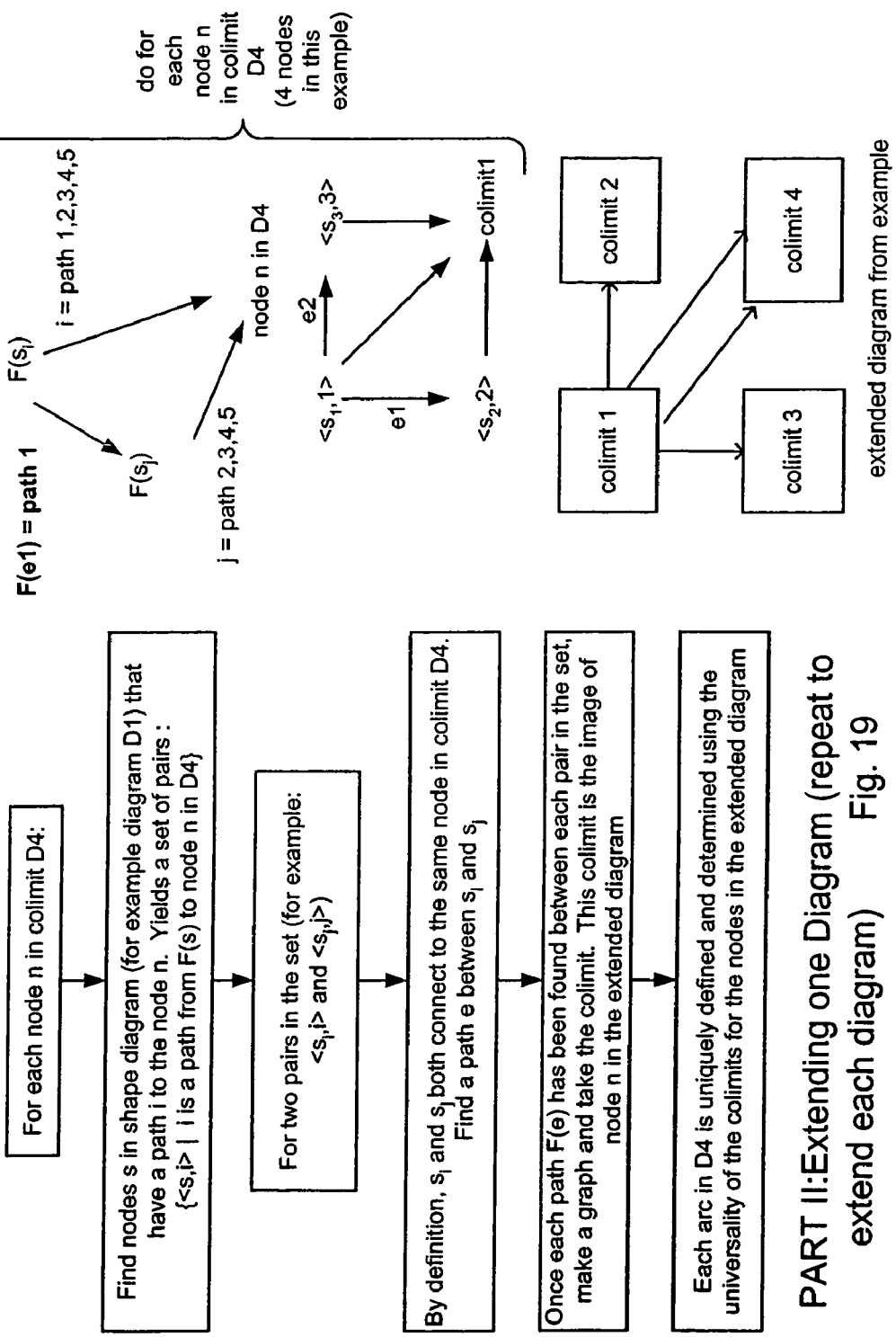
Fig. 19 PART II: Extending one Diagram (repeat to extend each diagram)

Example of Taking the Extension of Each Node of the Hereditary Diagram

More Detailed Example of Taking the Extension of Diagram d1 to Yield an Extended Diagram

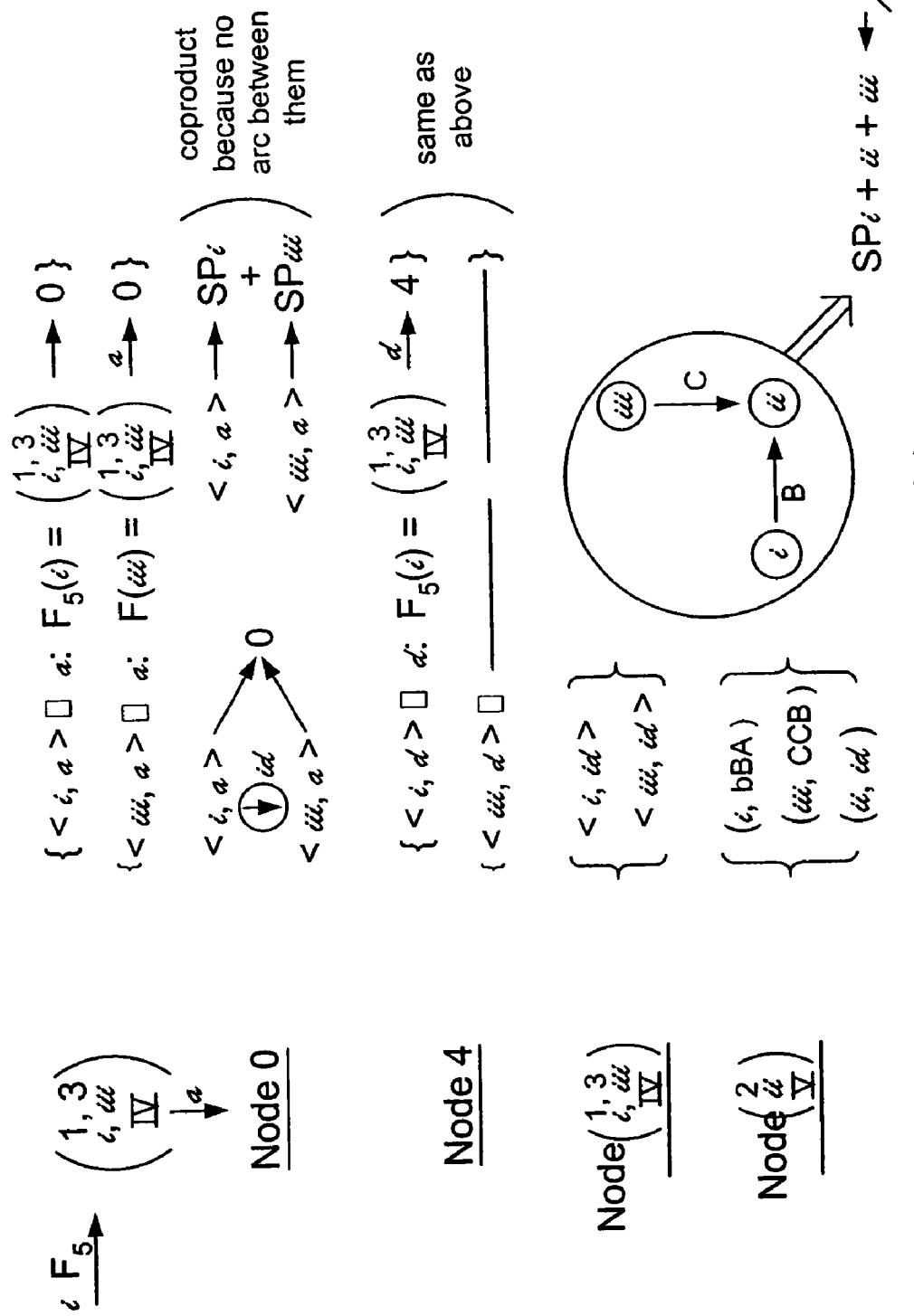
Fig. 21(b) Example of Diagram Extension

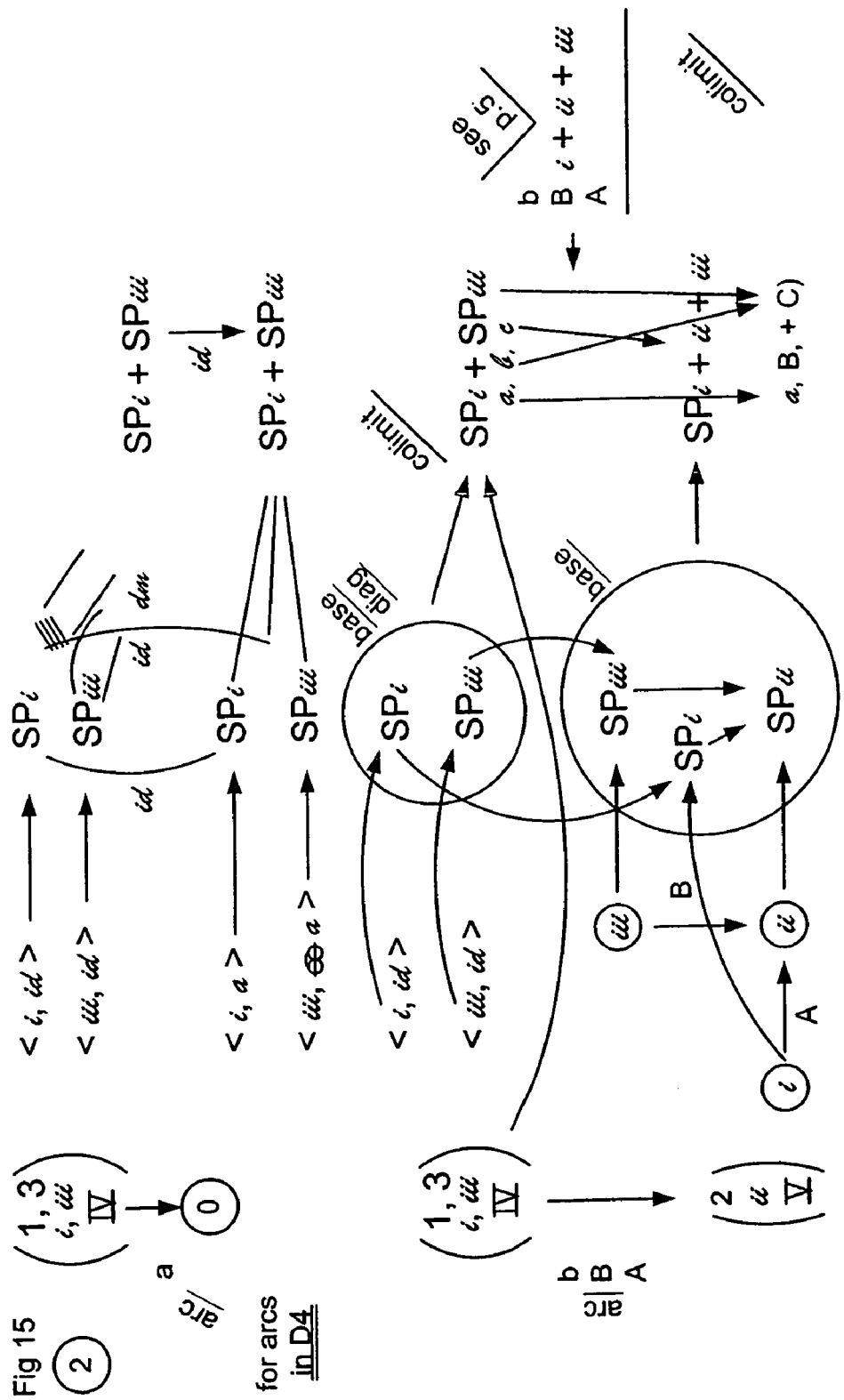
Fig. 21(c) Example of Diagram Extension (cont)

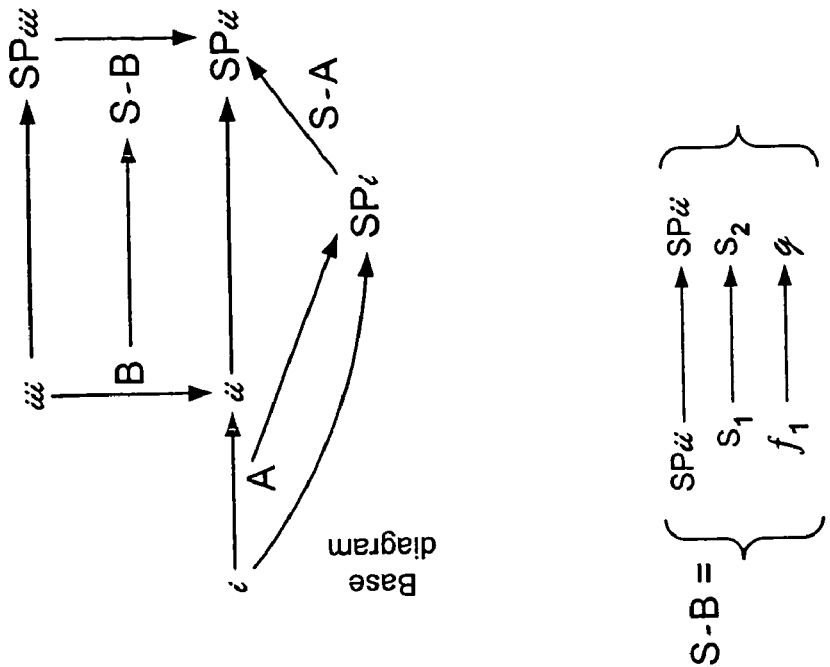
Fig. 21(d) Example of Diagram Extension (cont)

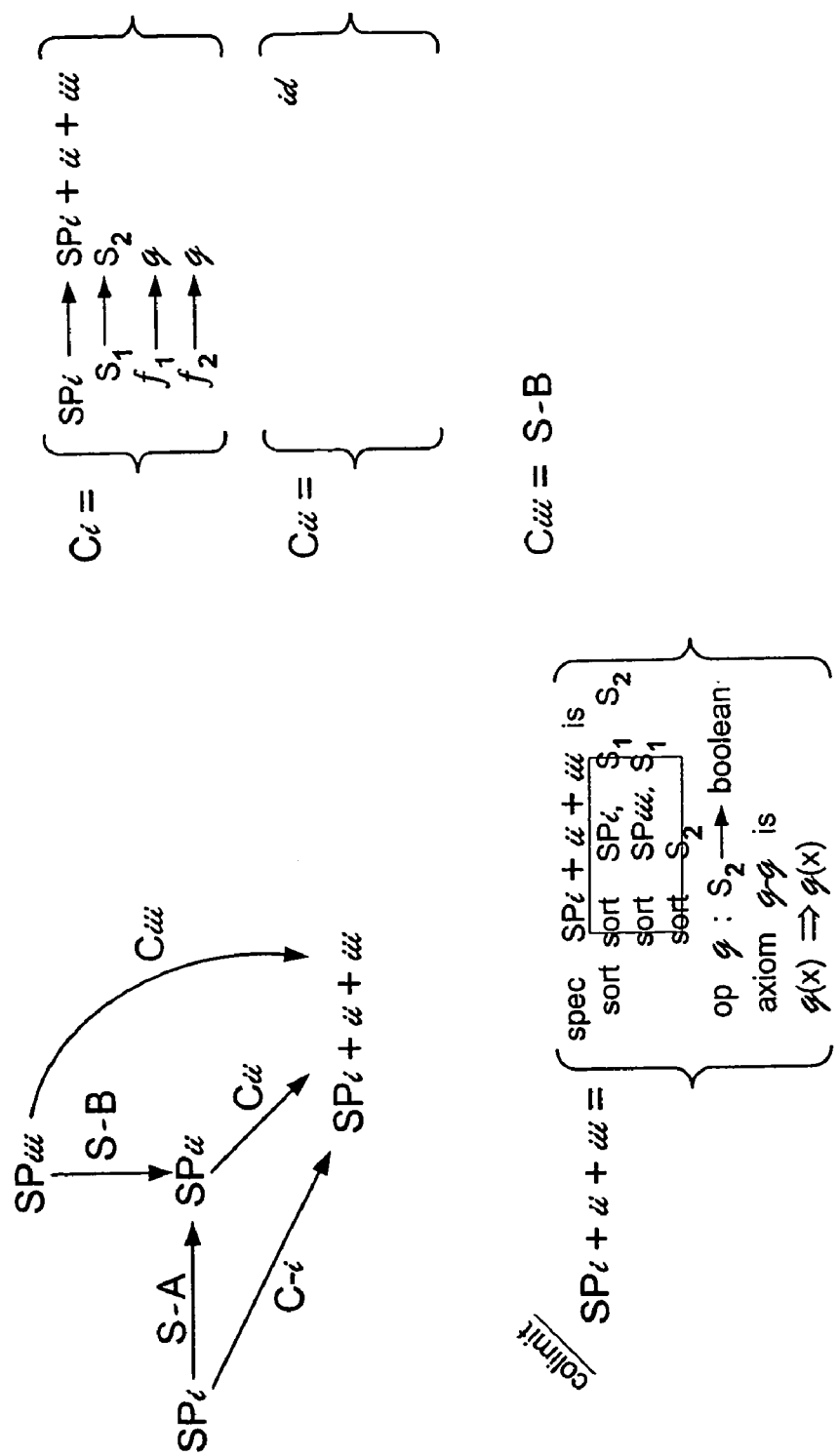
Fig. 21(e) Example of Diagram Extension (cont)

$$SPi + SPiii = \begin{Bmatrix} \text{sort} & SPi & S_1 \\ \text{sort} & SPiii - S_1 \\ \text{op} & SPi_1 f_1 : SPi - S_1 \rightarrow \text{boolean} \\ \text{op} & SPiii f_1 : SPiii - S_1 \rightarrow \text{boolean} \\ \text{op} & SPi f_2 : SPi - S1 \rightarrow \text{boolean} \end{Bmatrix}$$

$$B \begin{matrix} b \\ i + ii + iii \\ A \end{matrix}$$

$$SPi + ii + iii = \left\{ \text{See Fig. 21(e)} \right\}$$

$$B \begin{matrix} b \\ i + ii + iii \\ A \end{matrix} = \begin{Bmatrix} SPi \cdot S_1 \longrightarrow S_2 \\ SPiii \cdot S_1 \longrightarrow S_2 \\ SPi \cdot f_1 \longrightarrow g \\ SPiii \cdot f_1 \longrightarrow g \\ SPiii \cdot f_2 \longrightarrow g \end{Bmatrix}$$

Example of Diagram Extension (cont)

Fig. 21(f)

After finishing the extension for each diagrams, let us use the following example:
Original diagrams:
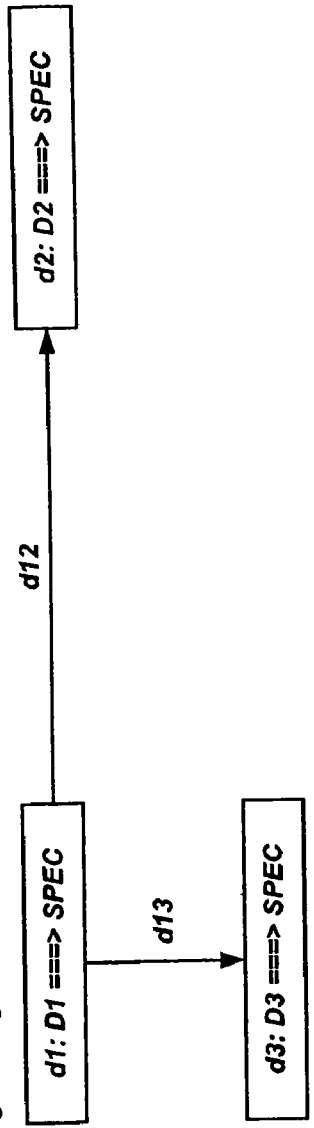
Its underlying shape categories, shape functors and the colimit are:
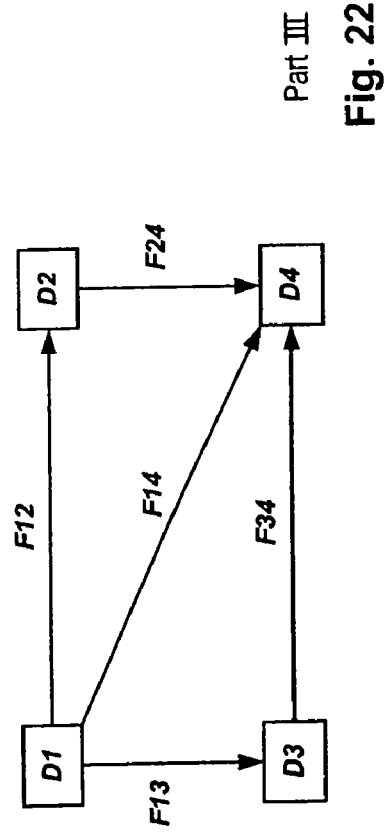
Part III
Fig. 22

Extended Diagrams:

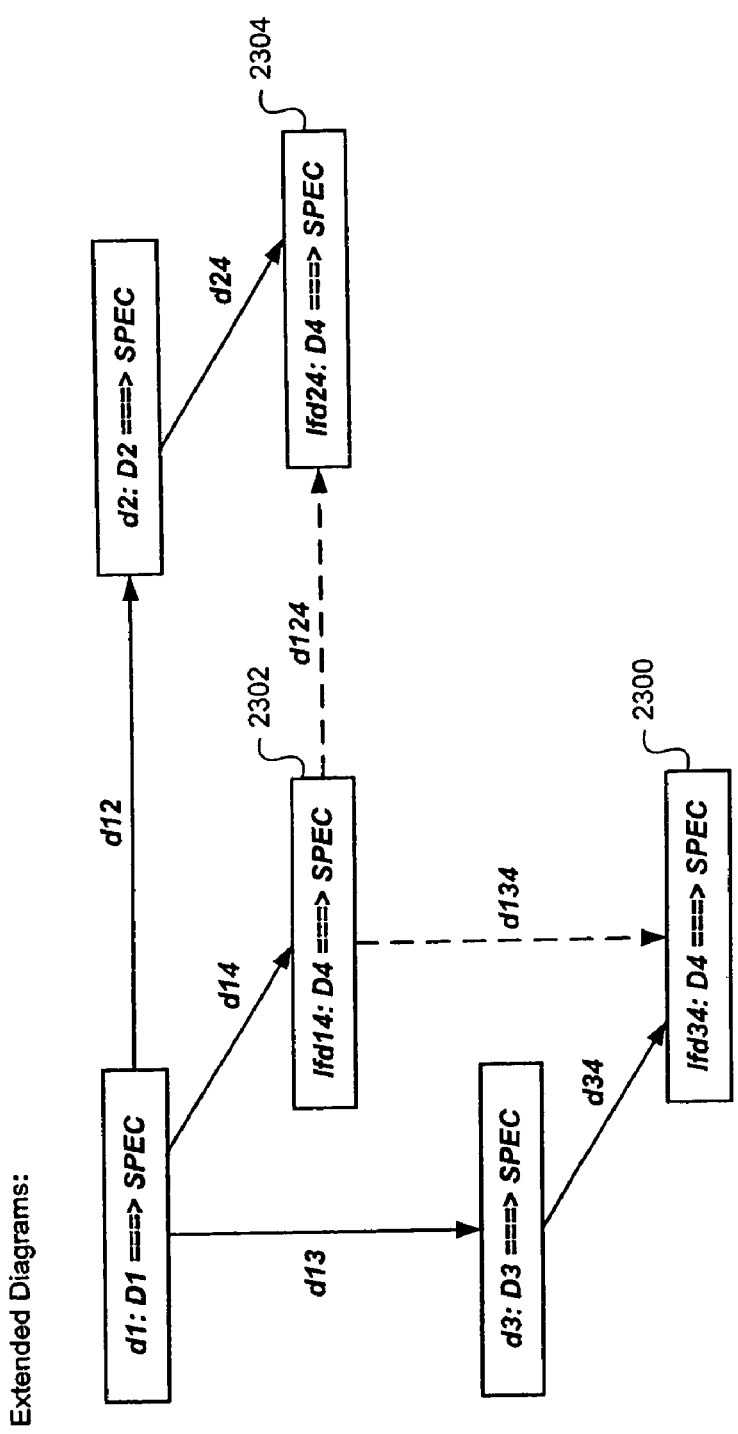

The last algorithm step we are missing for constructing the diagram colimits is the diagram morphisms between extended diagrams. For example, the diagram morphism d124 and d134 (dotted lined arrows in above figure) are the ones needed.

Suppose lfd14 and lfd24 are two extensions of d1 and d2, given the colimit of the shape categories as D4. We would have the following picture.

Fig. 23

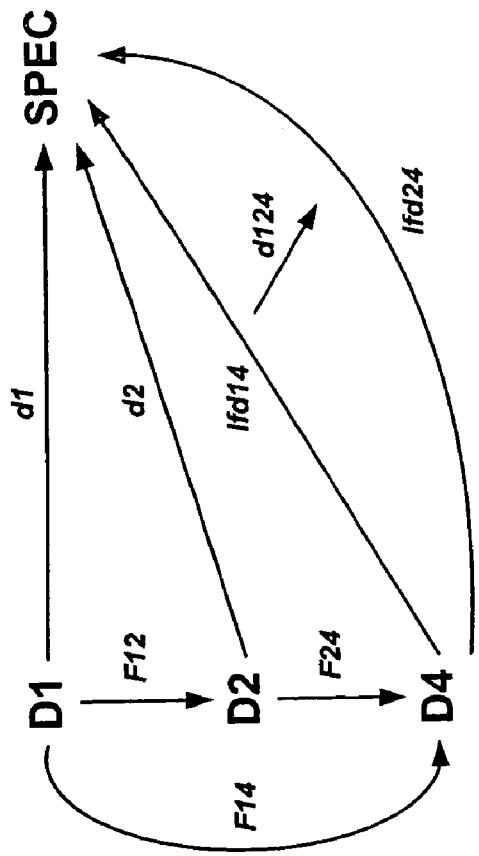

A morphism between lfd14 and lfd24 is a natural transformation which maps each node of D4 to an arrow in SPEC. We ?? ???? the universal construction of witness arrows.

For any node ni in D4, we have F14(ni) = F12 o F24(ni). Let Sp1ni and Sp2ni two shape categories used for constructing a mapping for ni in its extension of d1 and d2, respectively, then we can have a shape function between Sp1ni and Sp2ni (inclusion, basically). That induces a diagram morphism between the base diagrams for the target of ni in lfd14 and lfd24, respectively. By imposing that diagram morphism and cocone morphism, we can get an unique arrow between lfd14(ni) and lfd24(ni). Repeating this process we construct a natural transformation between lfd14 and lfd24. Similarly, we can do this for any two extended diagrams.

The following flowchart is the algorithm for constructing a diagram morphism between two extended diagrams.

Fig. 24

Taking Pointwise Colimit of Extended Diagrams
(Can be done, since extended diagrams are all the same shape)

Diagram

| Arc; source and target nodes | ... | Arc; source and target nodes | Total number of Arcs |

Hereditary Diagram

| Arc; source and target diagrams | ... | Arc; source and target diagrams | Total number of Arcs |

Arc

| Shape functor (Fe) | Natural Transformation (Fn) |

Shape Morphism Graph

| Diagram Category Pair | Arc |

Examples of Data Structures used in the Example Implementation

Fig. 27

METHOD AND APPARATUS FOR DETERMINING COLIMITS OF HEREDITARY DIAGRAMS

RELATED APPLICATIONS

This application claims priority under 35 U.S.C. § 119(e) to U.S. application Ser. No. 60/155,271 entitled "Method and Apparatus for Determining Colimits of Hereditary Diagrams" of Pavlovic et al., filed Sep. 19, 1999, which is herein incorporated by reference in its entirety.

This invention was made with Government support under Contracts F30602-96-C-0282, F30602-97-C-0154 and MDA904-94-C-B011 awarded by the Air Force and the Maryland Procurement Office. The Government has certain rights to this invention.

BACKGROUND OF THE INVENTION

The present invention relates generally to system design and, specifically, to a method and system used to refine stratified design specifications, presented as hereditary diagrams.

The design of systems, such as computer systems or engineering systems is a complex process. While it is possible to design systems from scratch using a minimum of design tools, most modern designers use tools to represent and manipulate designs for complex systems.

SUMMARY OF THE INVENTION

In the described embodiment of the present invention, a user specifies his design using a specification language. Specification software manipulates the specified design to yield a more detailed system design. Some of these manipulations involve use of a library of specifications.

Specifications are the primary objects in the described specification language. A specification can represent any system or realm of knowledge such as computer programming or circuit design and describes a concept to some degree of detail. To add properties and extend definitions, the described specification software allows the user to create new specifications that import or combine earlier specifications. This process is called refinement. Composition and refinement are the basic techniques of application development in the described specification software. A user composes simpler specifications into more complex ones, and refines more abstract specifications into more concrete ones. Refining a specification creates a more specific case of it.

In the described embodiment, specifications can represent an object or concept. A complex specification can be presented as a diagram of simpler specifications. A software specification is a formal representation of objects or concepts that come about in a software development project. In the described embodiment, a complex specification can be composed and refined as a diagram of simpler specifications; still more involved specifications can be composed as diagrams of such diagrams; and so on. Large specifications are thus subdivided into diagrams of smaller specifications. The process of software design is stratified into such diagrams, diagrams of diagrams and so on. This is what is meant by the expression "hereditary diagrams of specification." A diagram includes:

A set of nodes (or vertices)
A set of arcs (or edges or arrows), and
Two mappings, assigning two nodes to each arc: its source-node and its target-node.

The nodes of a diagram of specifications are formal specifications, capturing the relevant objects and concepts to be specified, the arcs of a diagram of specifications are the "specification morphisms," capturing the relationships between the nodes: how some specifications inherit or share the structure specified in others. Diagrams thus provide a graphically based method for software development and refinement, allowing "modular decomposition" and reuse of software specifications.

The described embodiments of the software development tool support:

Specification refinement: deriving a more concrete specification from a more abstract specification by adding more structural detail Code generation: when enough structural detail has been specified to determine concrete programming structures suitable to perform the required task, code in a suitable language is generated.

Colimit determination

In general, determination of a colimit is a destructive operation, resulting in the loos of information about the involved diagrams. The described embodiments of the invention protect and retain the diagrams by folding them into a node. Since the described embodiment allow for diagrams of diagrams, this protection can occur in a multi-level diagram of diagrams.

Nodes of a diagram show the objects or concepts and arcs between the nodes show relationships (morphisms) between the nodes. Diagrams are used primarily to create sets of objects and to specify their shared parts, so that the individual parts can be combined. Specifications can also be defined to be hereditary diagrams.

The described specification software allows a user to derive a more concrete specification from a more abstract specification. In general, the complexity of a specification is increased by adding more structural detail. The following techniques are preferably used (separately or together) to refine specifications:

the import operation, which allows a user to include earlier specifications into a later one;

the translate operation, which allows a user to rename the parts of a specification; and the colimit operation, which glues concepts together into a shared union along shared sub-concepts.

Use of diagrams (and hereditary diagrams) allows the user to retain information about a specification during the design process. The described embodiment of the present invention allows a user to define a specification that is a hereditary diagram and to perform the colimit operation on the hereditary diagram.

The described embodiments include specification diagrams and compute colimits in this category. Furthermore, the described embodiments iterate this procedure, yielding the category of hierarchical diagrams, and computes colimits for these hierarchal diagrams.

BRIEF DESCRIPTION OF THE DRAWINGS

FIG. 14 provides an example of a diagram of shape categories for the hereditary diagram of FIG. 13.

FIGS. 15(a)–15(d) provide a more detailed example of the diagram of FIG. 14.

FIG. 17 provides an example of a colimit of a diagram of shape categories.

FIGS. 18(a)–18(f) provide a more detailed example of the colimit of FIG. 17.

FIG. 19 is a flow chart showing a second part of the method of FIG. 10 to extend a diagram in the hereditary diagram in accordance with the colimit of the shape diagram.

FIGS. 21(a)–21(f) provide a more detailed example of an extended diagram.

FIG. 22 is a flow chart showing a third part of the method of FIG. 10.

FIG. 23 provides an example of a taking a colimit of extended diagrams.

FIGS. 24–26 provide a more detailed example of taking a colimit of extended diagrams to yield a colimit of the original hereditary diagram.

FIG. 27 shows example data structures used in a preferred embodiment.

DETAILED DESCRIPTION

General Discussion

The described embodiment provides a software tool for building, manipulating, and reusing a collection of related specifications. The tool allows a user to describe concepts in a formal language with rules of deduction. It includes a database (library) that stores and manipulates collections of concepts, facts, and relationships. The present invention can be used to produce more highly refined specifications until a concrete level of abstraction is reached. For example, a specification can be refined until it reaches the computer source code level. As another example, a specification can be refined until it reaches the circuit level.

Figure 1:
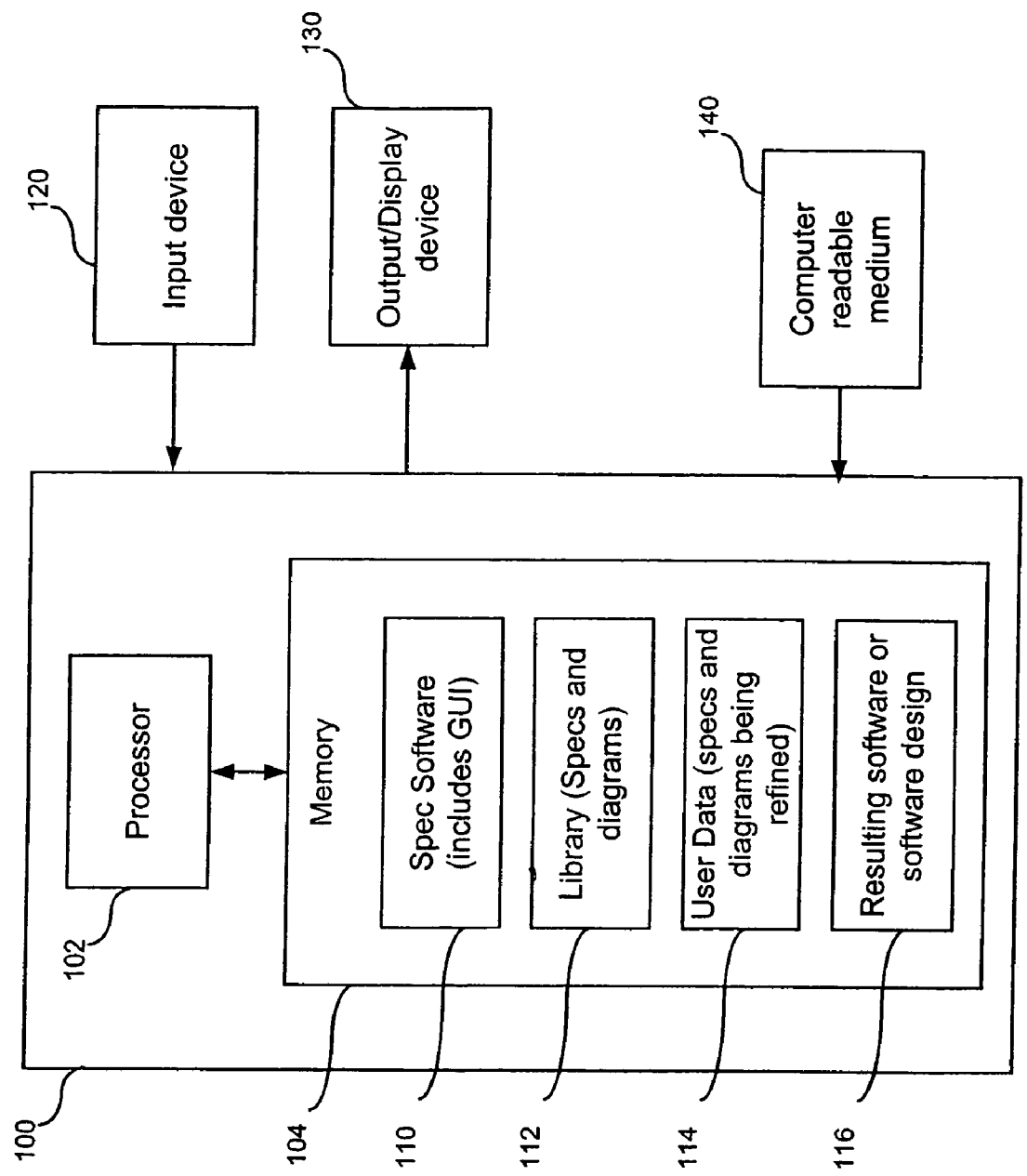
FIG. 1 is a block diagram of the overall architecture of an embodiment of the present invention.

Referring now to FIG. 1, there is shown a block diagram of the overall architecture of an embodiment of the present invention. FIG. 1 includes a data processing system 100 including a processor 102 and a memory 104. Memory 104 includes specification software 110, which implements the refinement methods defined herein. Specification software 110 preferably implements a graphical user interface (GUI) that allows a user to define specifications and morphisms and that allows a user to indicate refinements to be performed on the specifications. Specification software 110 includes or accesses a database 112 that includes definitions of specifications and diagrams. The specification being refined is stored in memory 114. The refinement operations indicated by the user can result in computer code 116 if the user chooses to perform refinements to the computer code level.

Figure 2A:
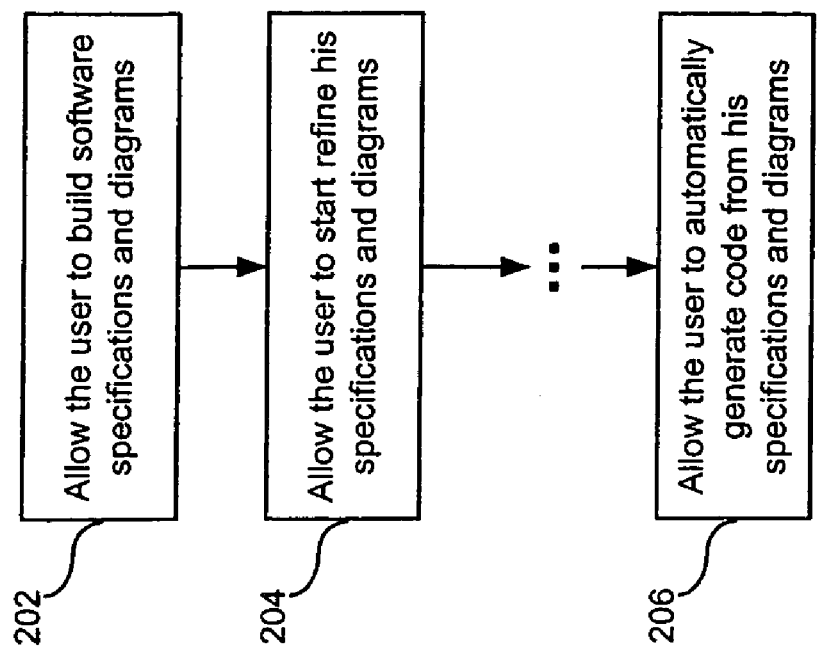
FIGS. 2(a) and 2(b) are flow charts showing step-wise refinements of a specification.
Figure 2B:
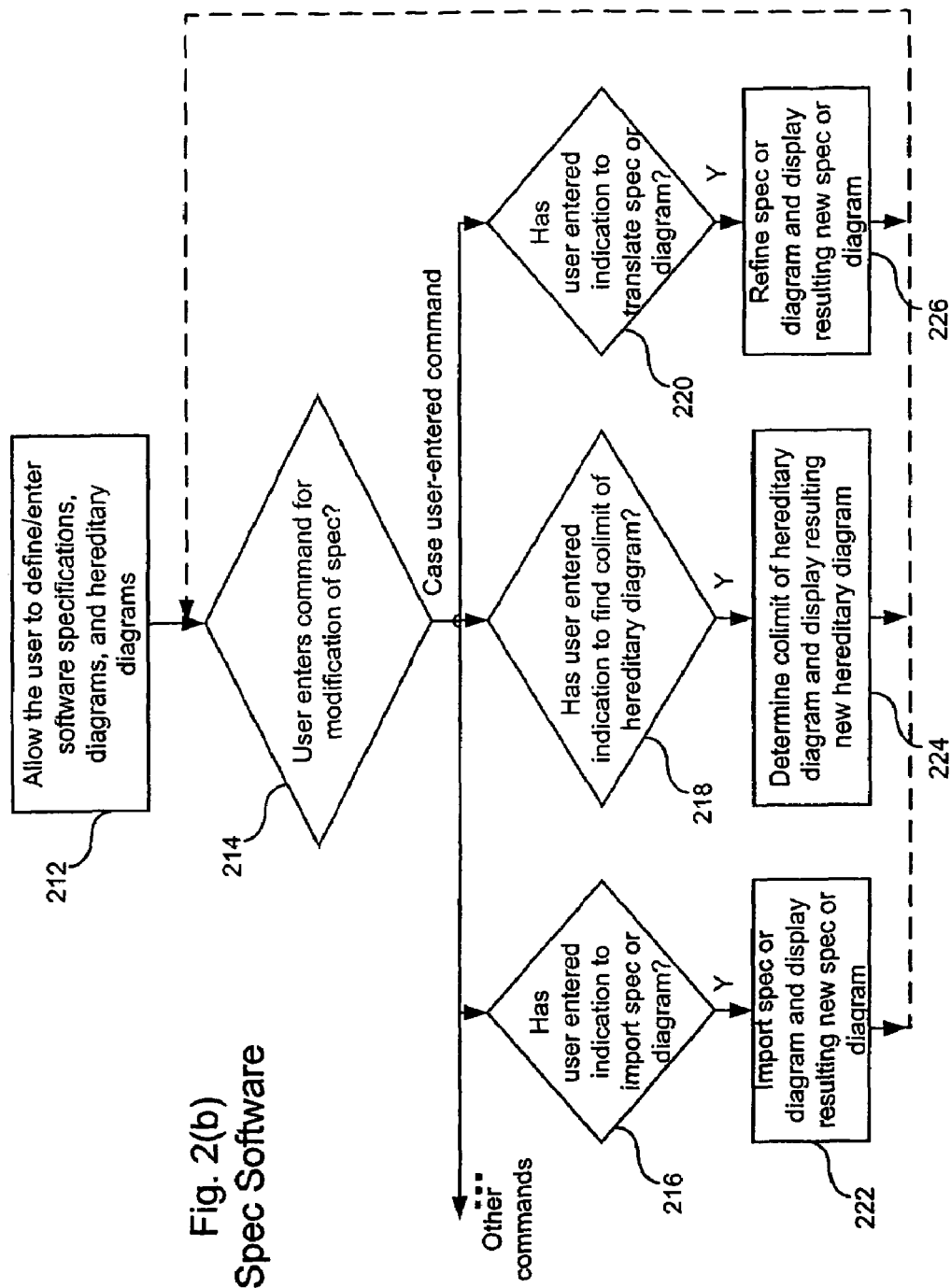
Figure 29:
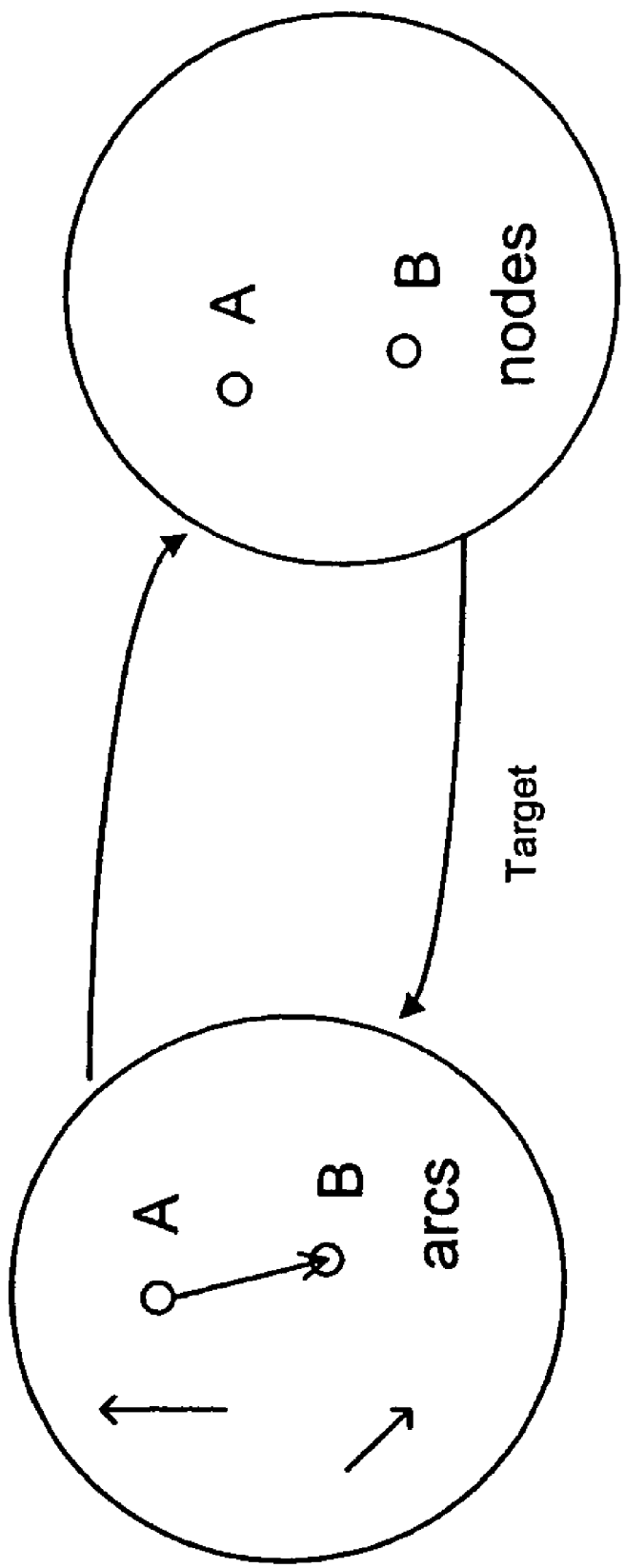
FIG. 29 is a diagram showing a conceptual view of a set of arcs and a set of nodes, with a target mapping and a source mapping between them.

FIGS. 2(a) and 2(b) are flow charts showing step-wise refinements of a specification during an exemplary design process. In element 202 of FIG. 2(a), the user is allowed to define/enter software specifications, diagrams, and hereditary diagrams (also called a "hierarchical diagram" or a "diagrams of diagrams"). Specifications are the primary objects defined by a user. In the described embodiment, specifications can represent a simple object or concept. A specification can also be a diagram, which is a collection of related objects or concepts. As shown in FIG. 29, nodes of a diagram show the objects or concepts and arcs between the nodes show relationships (morphisms) between the nodes. Diagrams are used primarily to create sets of objects and to specify their shared parts, so that the individual parts can be combined. Specifications can also be defined to be hereditary diagrams, where at least one object in a node of the diagram is another diagram.

Specifications can be defined in any appropriate specification language, such as the SLANG language defined by the Kestrel Institute of Palo Alto, Calif. SLANG is defined in the SLANG Users Manual, available from the Kestrel Institute of Palo Alto, Calif. The Slang Users Manual is herein incorporated by reference. A specification can represent any system or realm of knowledge such as computer programming or circuit design and describes a concept to some degree of detail.

In element 204, the user is allowed to start refining his specifications, diagrams, and hereditary diagrams. To add properties and extend definitions, the described specification software allows the user to create new specifications that import or combine earlier specifications. This process is called refinement. Composition and refinement are the basic techniques of application in the described specification software. A user composes simpler specifications into more complex ones, and refines more abstract specifications into more concrete ones. Refining a specification creates a more specific case of it.

The described specification software allows a user to derive a more concrete specification from a more abstract specification. In general, the complexity of a specification is increased by adding more structural detail. The following techniques, among others, are preferably used (separately or together) to refine specifications:

the import operation, which allows a user to include earlier specifications into a later one;

the translate operation, which allows a user to rename the parts of a specification; and the colimit operation, which glues concepts together into a shared union along shared sub-concepts.

FIG. 2(b) is a flow chart of a method for refining a specification. The user indicates a refinement operation, which is then performed by specification software 110. FIG. 2(b) shows three examples of refinement operations. It will be understood that other refinements are possible. In element 216, the user indicates that a spec or diagram is to be imported. In element 218, the user indicates finding a colimit of a hereditary diagram. In element 220, the user indicates a translation of a spec or diagram.

In element 206 of FIG. 2(a), the user refines his specification to a level of generating computer code. A user may choose not to refine a specification to this level. The refinement process can be used for purposes other than generating computer source code. For example, the refinement process can be used to help understand a specification. As another example, the refinement process can be used to help verify the consistency of a specification.

The Colimit Operation

Figure 3B:
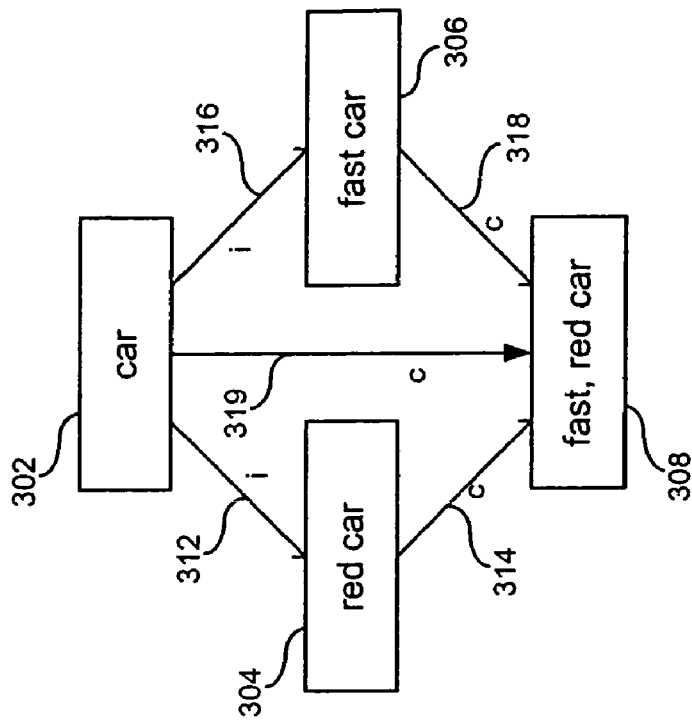
FIGS. 3(a) and 3(b) show a conceptual example of a colimit operation.
Figure 3A:
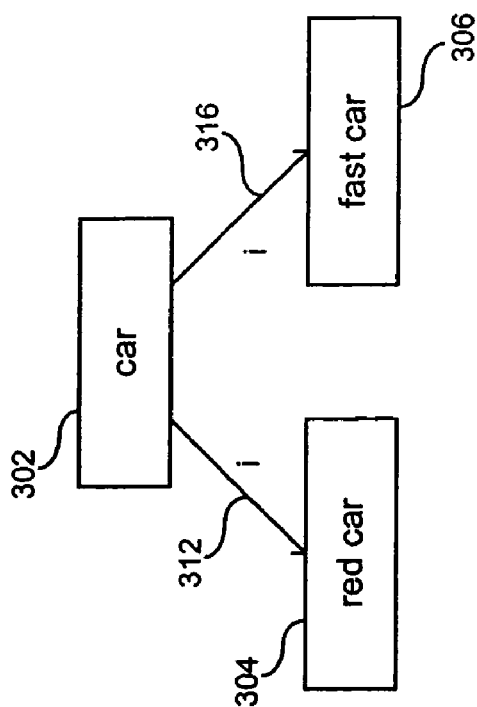
Figure 4B:
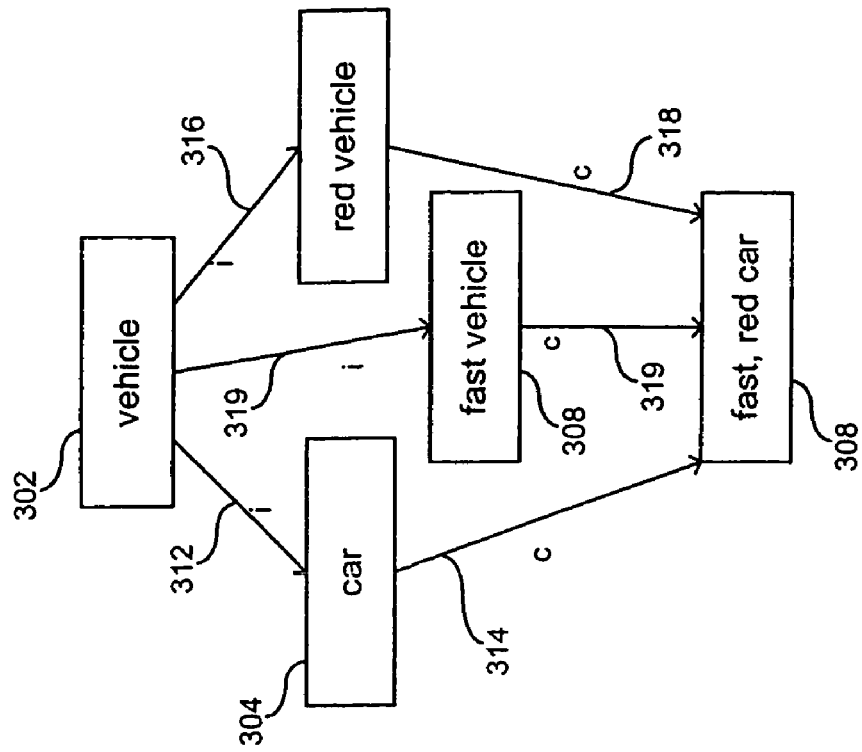
FIGS. 4(a) and 4(b) show another conceptual example of a colimit operation.
Figure 4A:
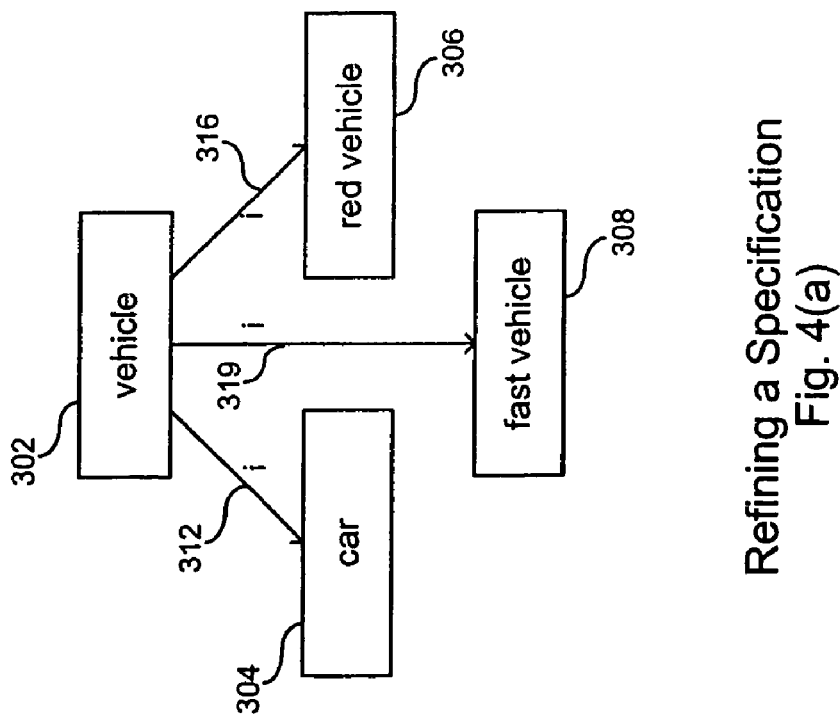

FIGS. 3(a) and 3(b) show a conceptual example of a colimit operation. A colimit is also called "composition" or a "shared union." A "pushout" is a colimit in which a colimit is taken of a parent node and its two children nodes. It will be understood that the examples of FIGS. 3 and 4 are somewhat simplified and are provided to aid in understanding of the colimit operation. In FIG. 3, the user has defined a spec "car" 302. This specification 302 has been refined by the user as red car 304 and fast car 306. Thus, the arcs from node 302 to 304 and 302 to 306 are labeled with an "i" (for instantiation/import). In FIG. 3(a), the "defining diagram" shows only the spec/morphism diagram from which the colimit is formed. FIG. 3(b) shows a "cocone diagram," which also shows the colimit and the cocone morphisms (labeled "c").

In the described embodiment, the GUI labels arcs as follows, although any appropriate labeling and morphisms could be used (or none).

i: instantiation morphism
d: definitional translation
t: transitional morphsim
c: cocone morphism
id: identity morphism The defining diagram for a colimit is not limited to a three node diagram. A colimit can be taken of any diagram. An example of a different diagram shape is shown in FIG. 3(b). In the colimit operation, any type of node related by morphisms in the diagrams are mapped to the same type of node in the colimit. Conversely, any unrelated types are mapped to different types in the colimit. The same is true of operations.

When you compose specifications, types or operations that have the same names in different component specifications might be mapped to different result operations. For example, suppose spec A and spec B are combined to form spec C. Both A and B have operations named concat, but the operations do not work the same way, and need to be differentiated in spec C. In this case, specification software 110 generates unambiguous names in the colimit. Similarly, types and operations that have different names in the component specifications can be mapped to a single element in the colimit. For example, the operation concat in spec A and add in spec B might both be mapped to a single concatenation operation in the colimit spec C. In this case, the resulting element preferably has both names.

Figure 5:
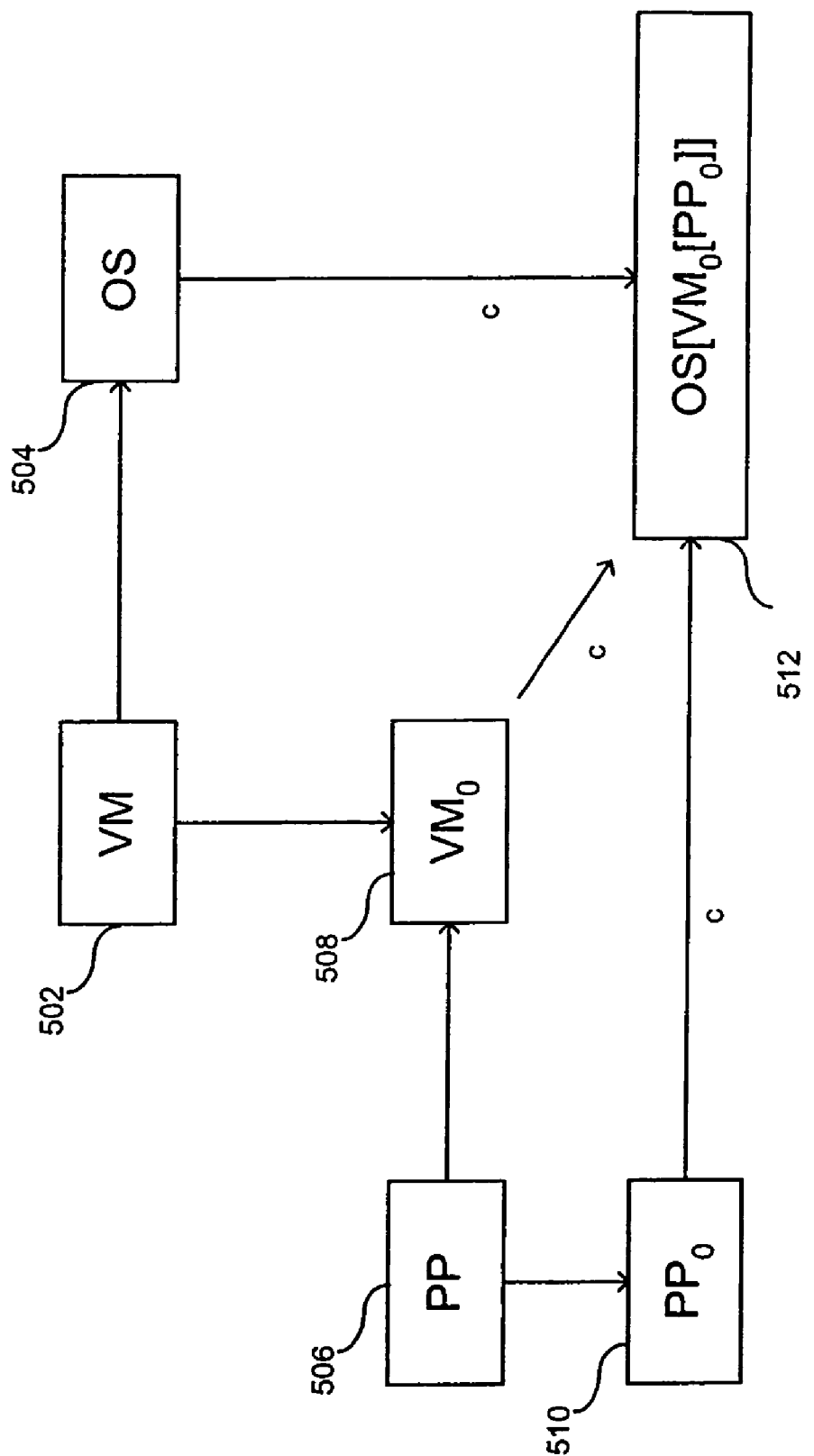
FIG. 5 shows an example of the colimit operation for a specification.

FIG. 5 shows a more realistic example of the colimit operation for a specification. In this example, a virtual memory (VM) is a parameter of the operating system (OS). Suppose we want to formally specify a simple operating system (OS). There are large fragments of the theory that can be abstracted away. In other words, the structure of the system does not depend on a particular virtual memory (VM) implementation. Thus, the formal VM requirements can be taken as a parameter of the formal OS specification. Similarly, a particular VM system, VM_0, can be a parametric in paging policies (PP). Thus, the parameter VM can be instantiated to another parametric specification VM_0.

In this way, a complex system naturally decomposes into simpler components that can be refined independently. When all components are implemented, an implementation of the whole can be automatically generated: an operating system with a particular virtual memory management and with a particular paging policy.

Figure 6:
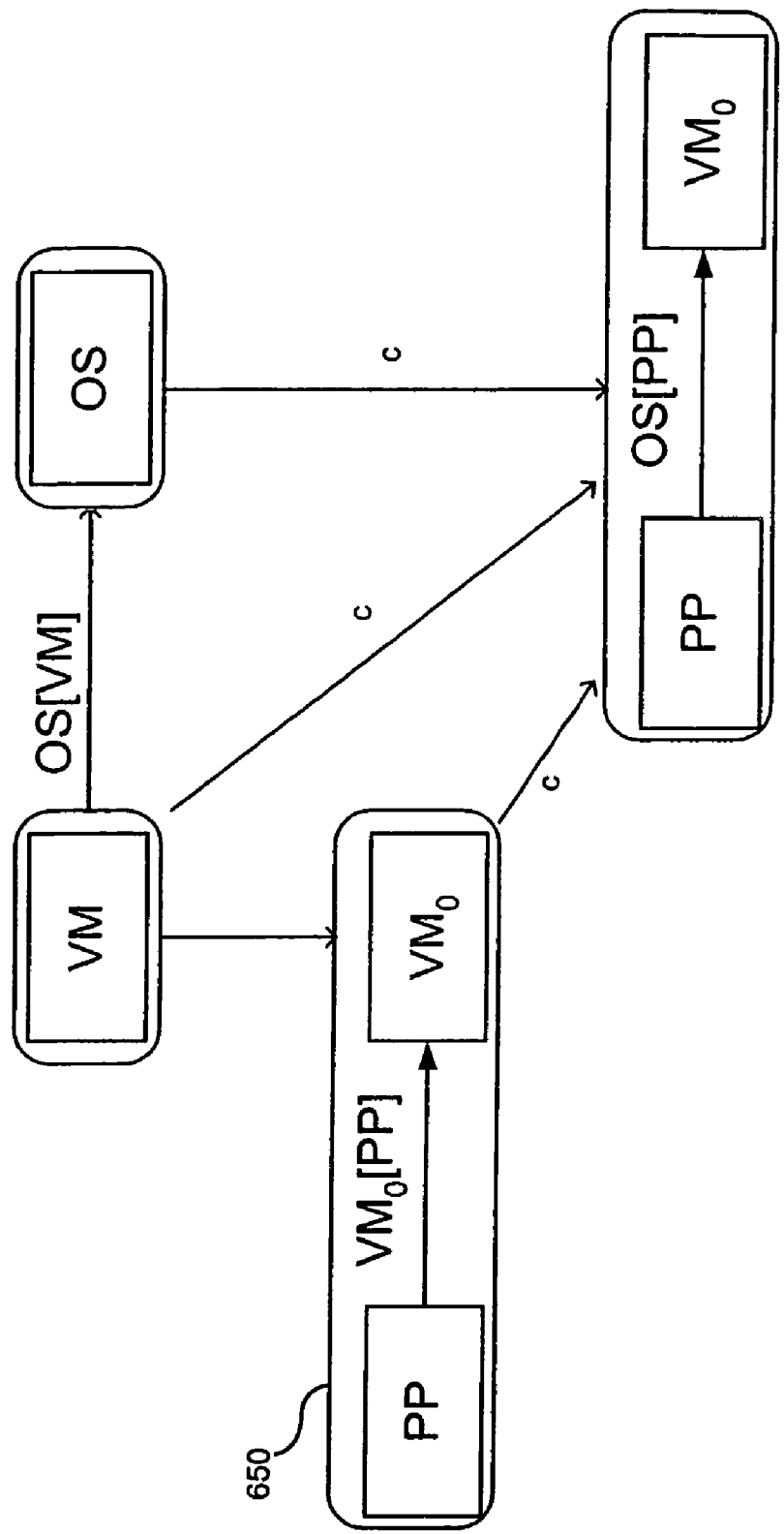
FIG. 6 shows an example of the colimit operation for a hereditary diagram.

Use of diagrams (specifically, hereditary diagrams) allows the user to retain information about a specification during the design process. Taking the colimit of simple specifications can destroy the structure of the spec. The described embodiment of the present invention allows a user to define a specification that is a hereditary diagram and to perform the colimit operation on the hereditary diagram. This carrying information in a diagram brings the colimit operation into lazy mode. FIG. 6 shows an example of the colimit operation for a hereditary diagram. Various intermediary choices can be made by the user as to how to define a diagram. For example, one may wish to instantiate the virtual memory parameter VM to VM_0, but to keep the page-in policy parameter PP open. The pspec VM_0 can then be protected as a diagram 650. The colimit operation can then be applied in the category of diagrams, rather than specs. Note that FIG. 6 shows an example of a hereditary diagram in which at least one node is a diagram.

The parameter VM to be instantiated for, lifts to a trivial diagram as well as the spec OS. The colimit of the resulting diagram yields the spec OS parametric over PP as a diagram.

Figure 7:
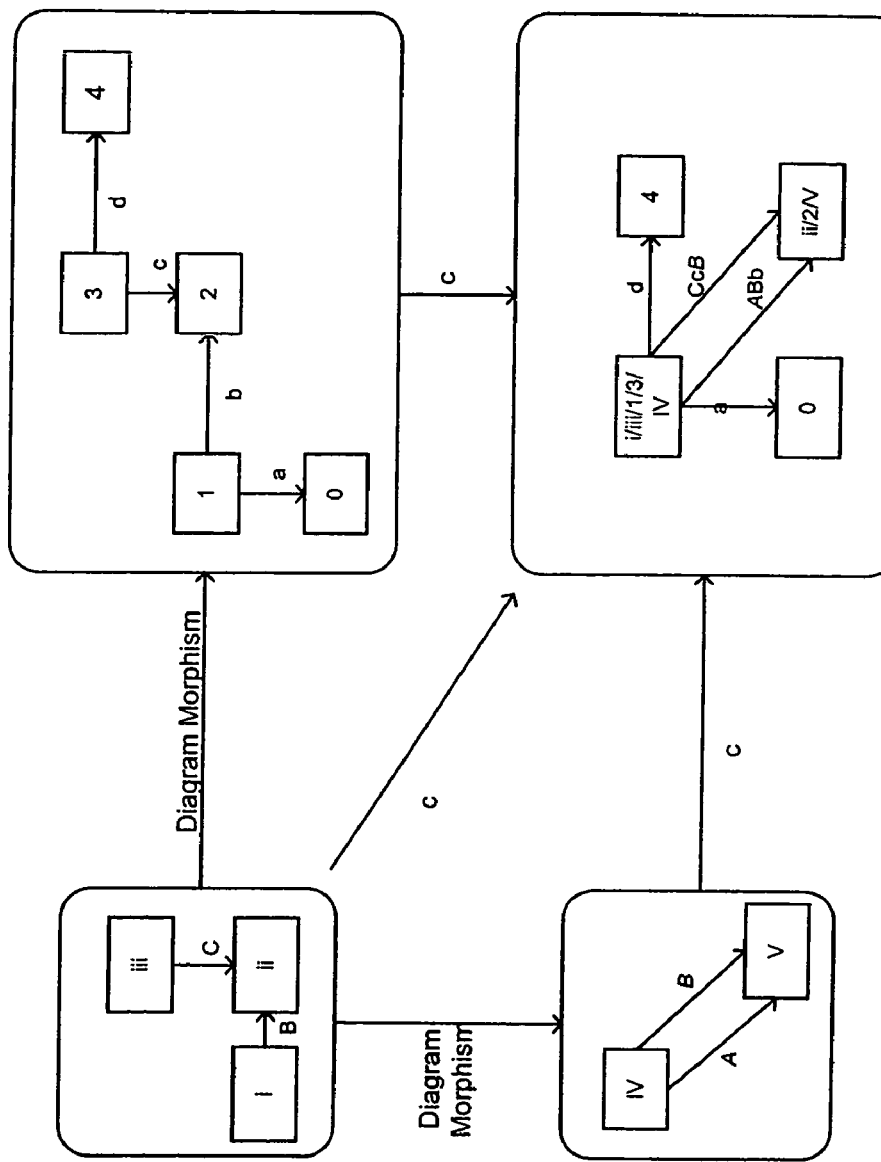
FIG. 7 shows another example of the colimit operation for a hereditary diagram.

FIG. 7 shows another example of the colimit operation for a hereditary diagram. Implementation details of colimits of hereditary diagrams are discussed below in connection with FIGS. 10–27. Shape changes of even simple diagrams quickly become too complex for human beings to solve intuitively. An automated method is needed, such as that shown in detail herein.

Figure 8A:
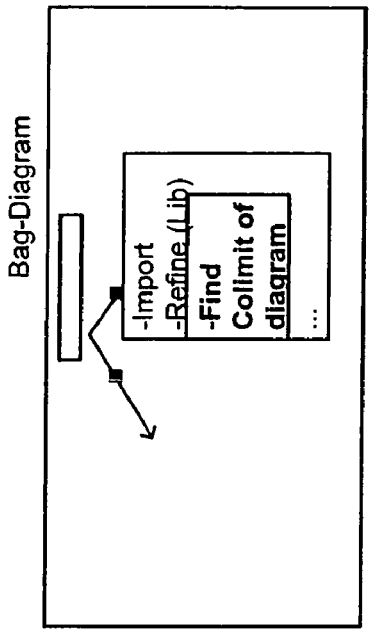
FIGS. 8(a), 8(b), and 8(c) show an example user interface for the colimit operation of a hereditary diagram.
Figure 8B:
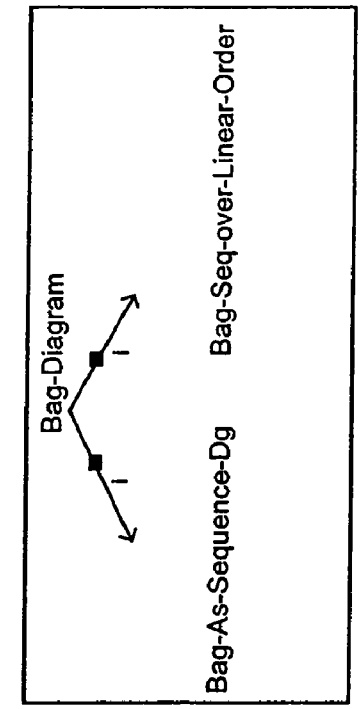
Figure 8C:
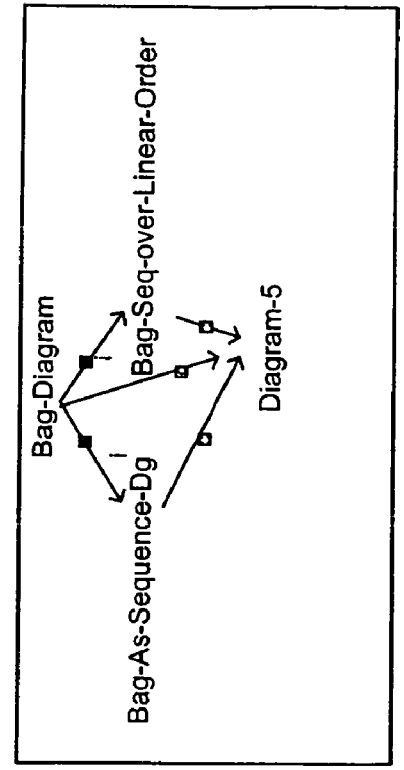

FIGS. 8(a), 8(b), and 8(c) show an example graphical user interface (GUI) for the colimit operation of a hereditary diagram. The display of FIGS. 8 and 9 preferably are generated by specification software 110. In FIG. 8(a), the user has defined a hereditary diagram. An initial (parent) spec is named Bag-Diagram. FIG. 9(c) shows details of Bag-Diagram. (The user may or may not choose to display the detail of the diagram Bag-Diagram and may instead display only the name of the diagram as shown in FIG. 8(a)). In this example, the user has refined the parent spec twice, to yield: Bag-as-Seq-Dg and Bag-Seq-over-Linear-Order. FIGS. 9(d) and 9(e) show details of these diagrams. (The user may or may not choose to display the detail of the diagrams and may instead display only the names of the diagrams as shown in FIG. 8(a)).

In FIG. 8(b), the user has selected the diagram having Bag-Diagram as its parent node and has indicated that he wishes to refine the hereditary diagram spec via the colimit operation. Although the disclosed interface uses a drop-down menu to allow the user to indicate the colimit operation, any appropriate interface can be used. In FIG. 8(c), the colimit is named Diagram-5. FIG. 9(j) shows details of this diagram. (The user may or may not choose to display the detail of the diagram and may instead display only the name of the colimit diagram as shown in FIG. 8(c)).

Figure 9A:
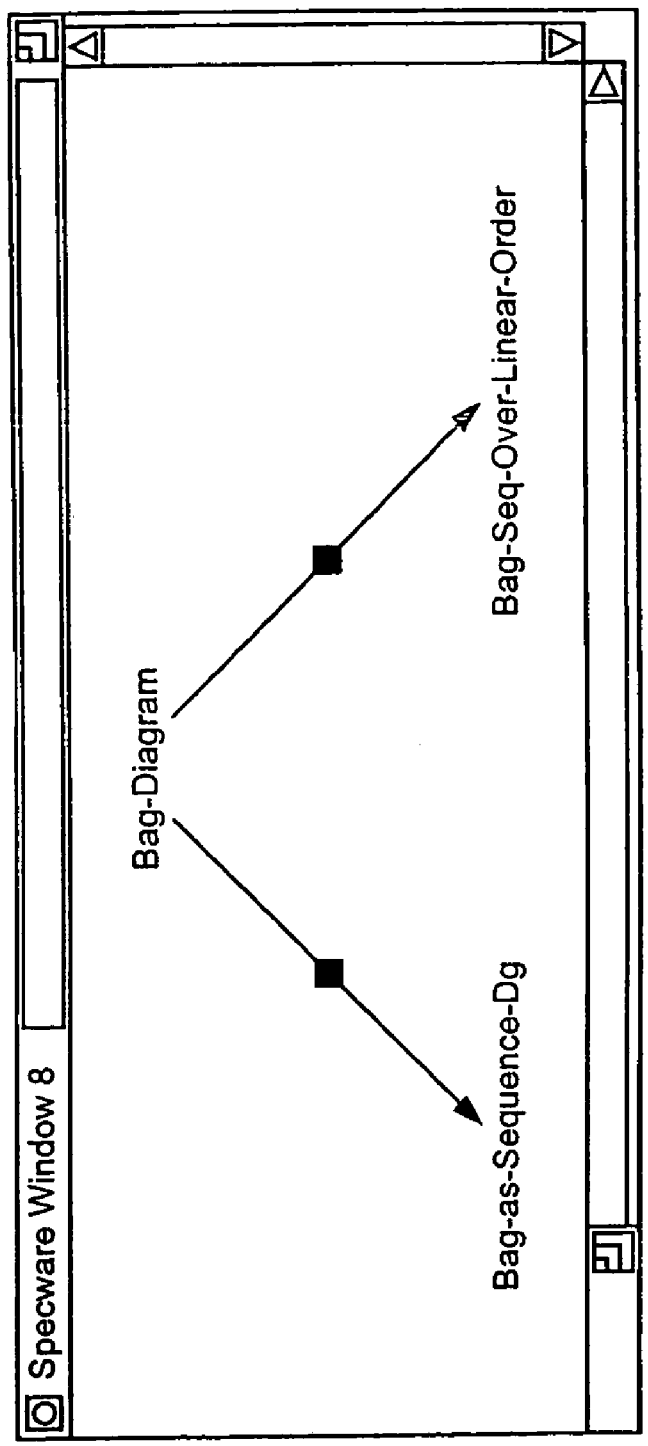
FIGS. 9(a)–9(j) show an example of operations initiated by the user to further illustrate the colimit operation for a hereditary diagram
Figure 9B:
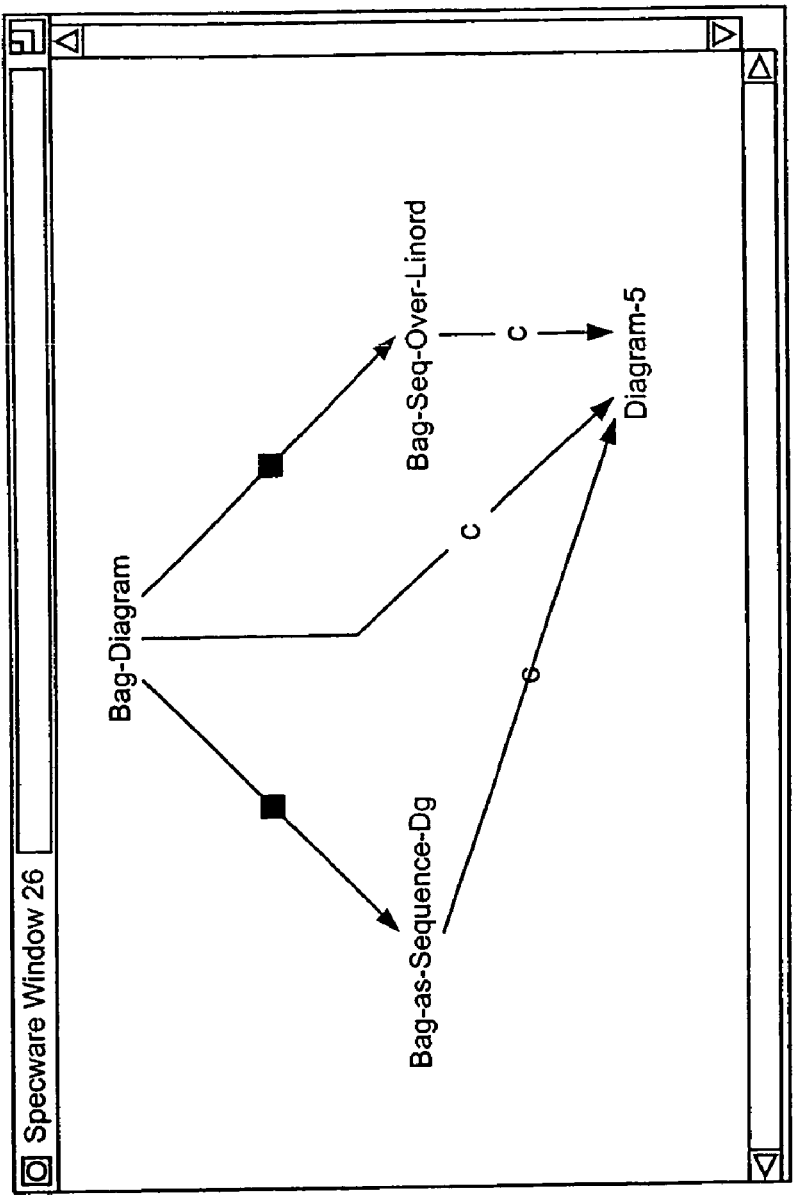
Figure 9C:
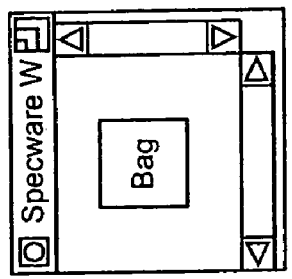
Figure 9D:
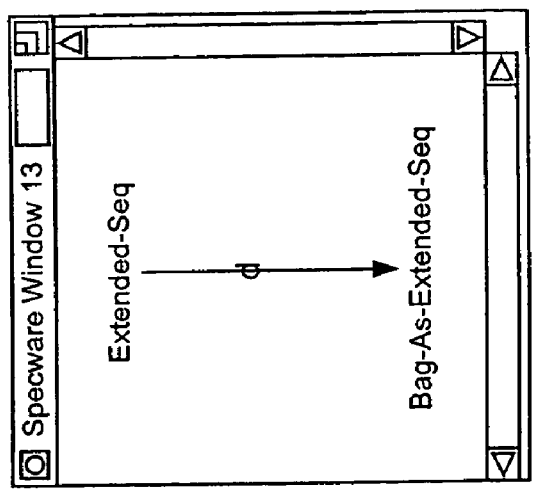
Figure 9E:
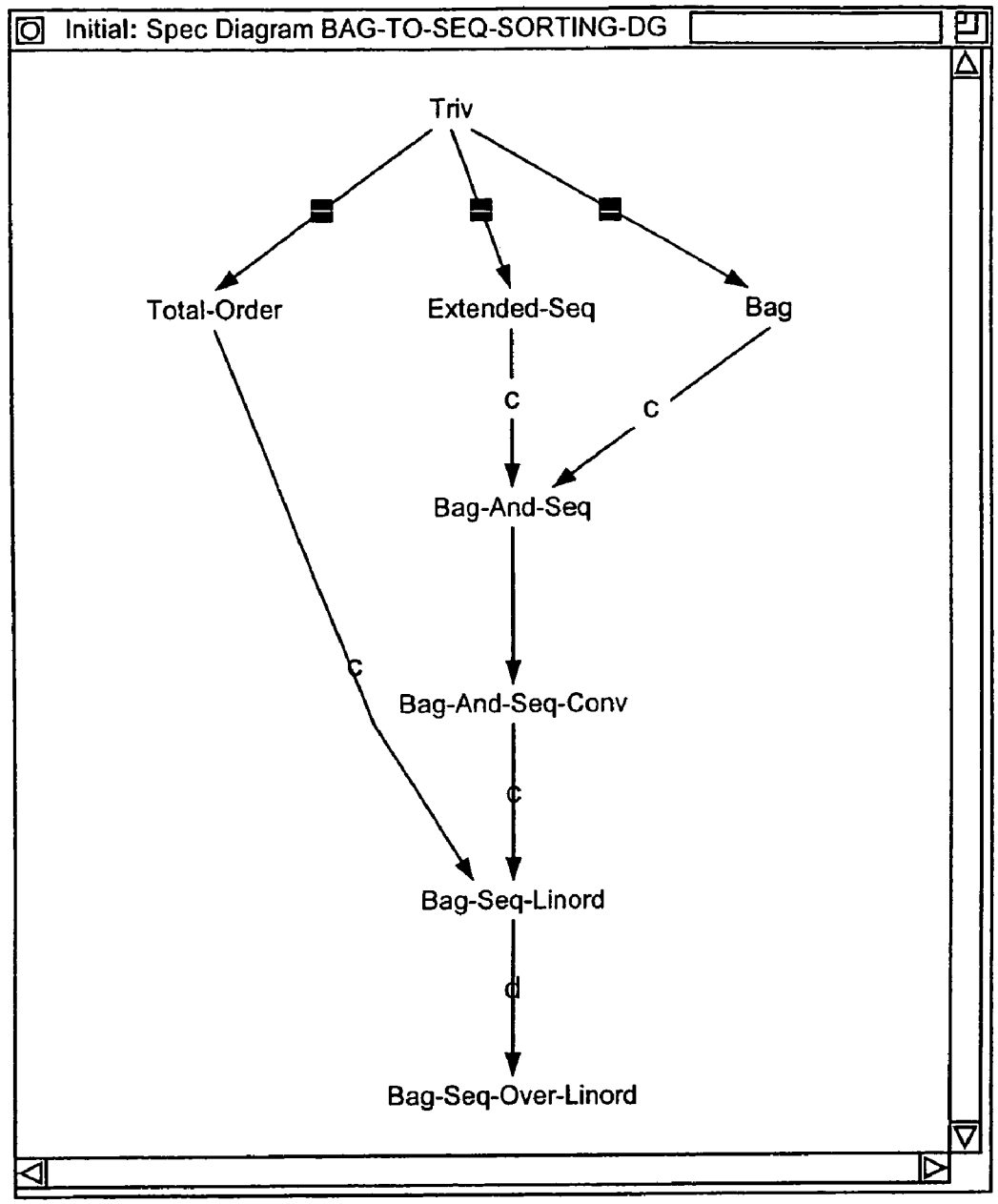
Figure 9F:
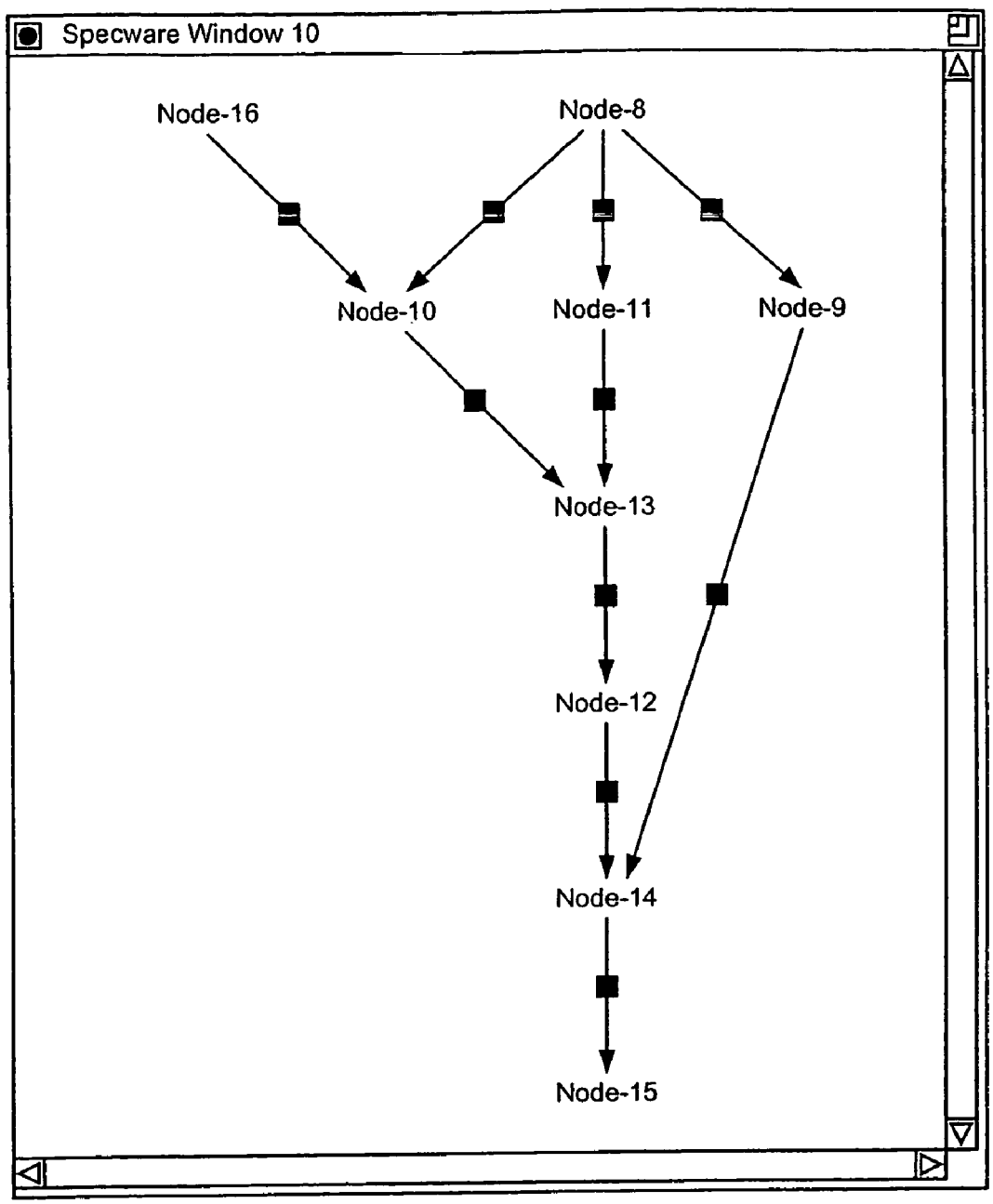
Figure 9G:
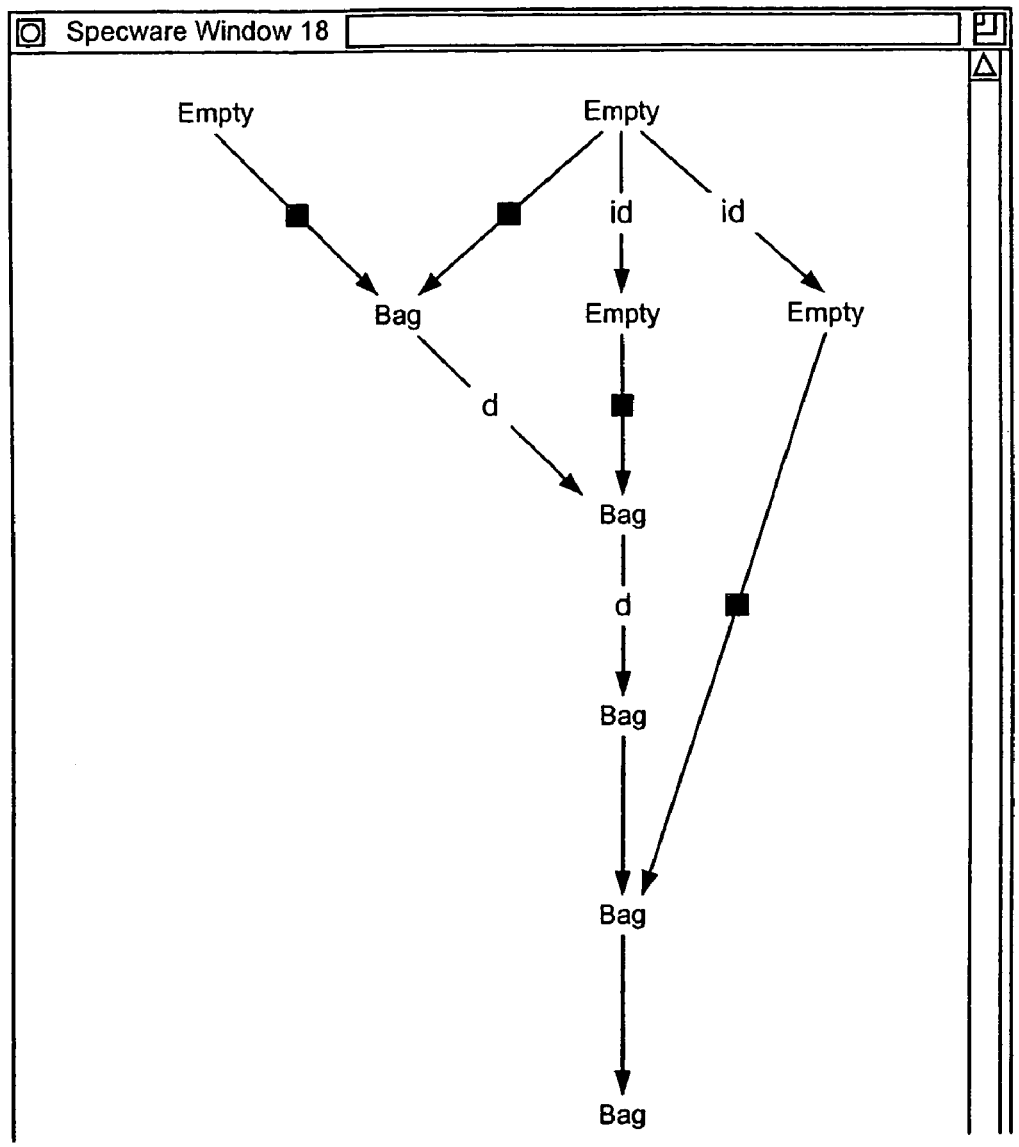
Figure 9H:
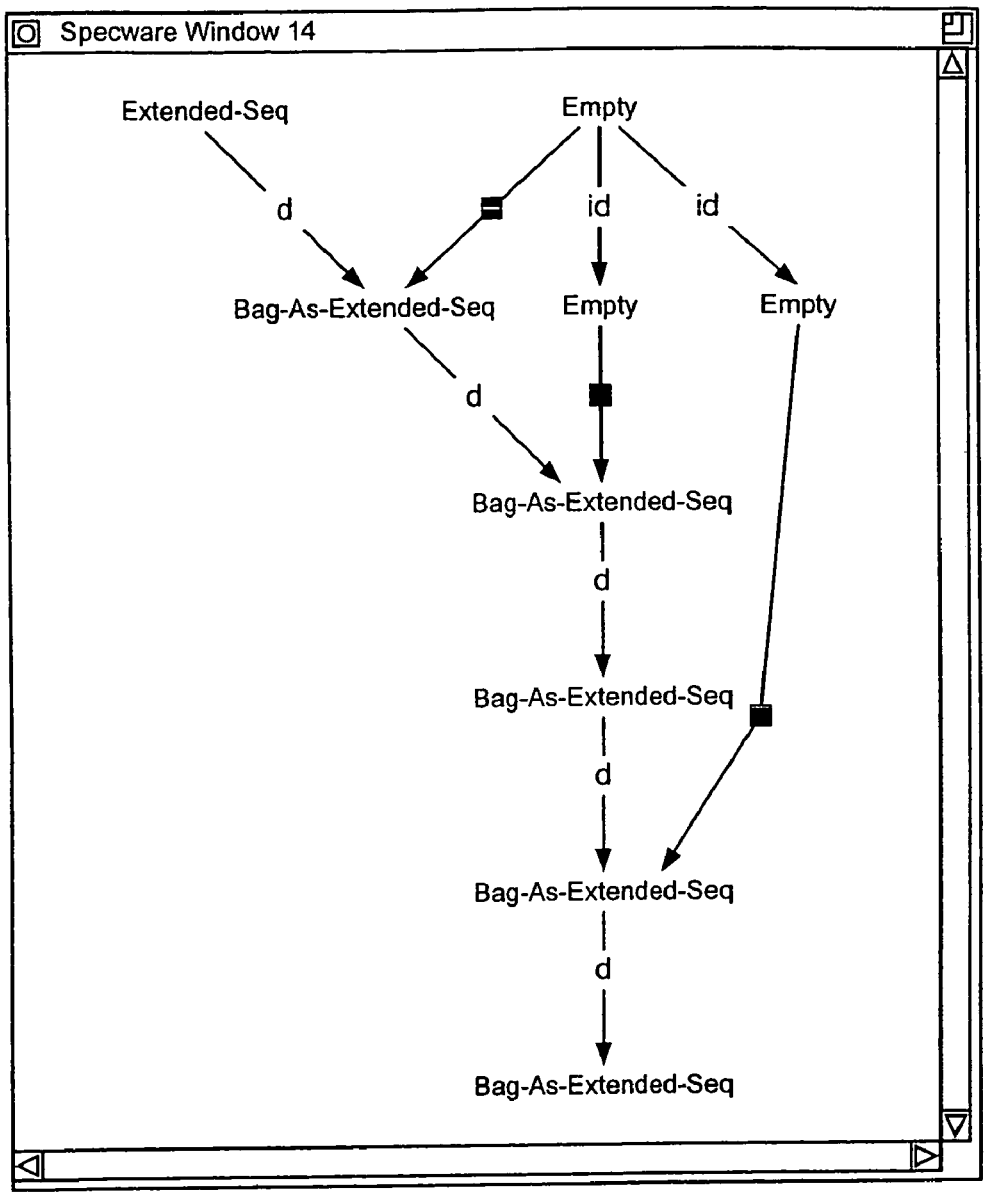
Figure 9I:
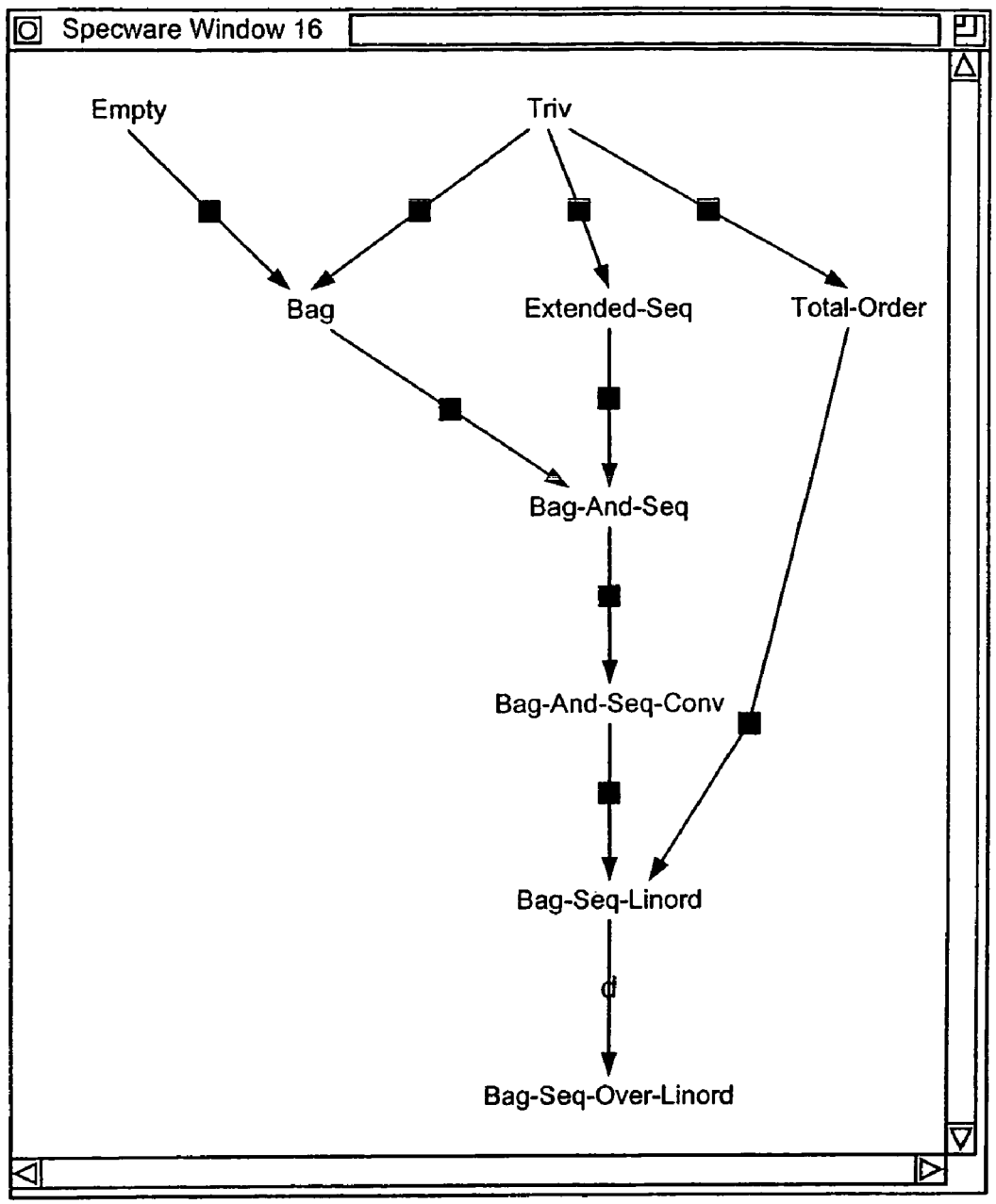
Figure 9J:
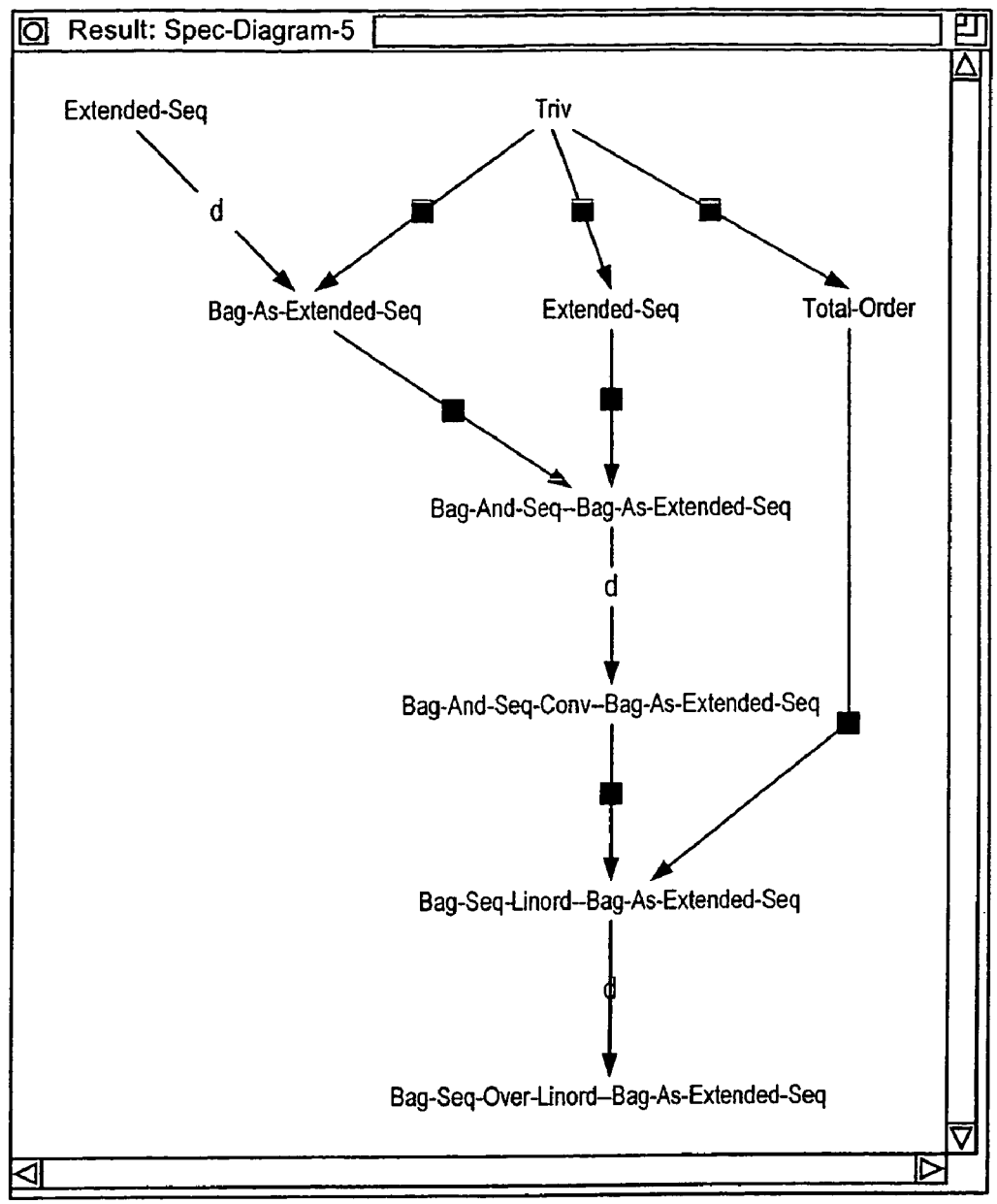

FIGS. 9(a)–9(j) show an example of operations initiated by the user to further illustrate the colimit operation for a hereditary diagram. FIG. 9(a) shows an initial hereditary diagram. FIG. 9(b) shows an example of the result of the colimit operation indicated by the user. FIG. 9(c) shows an expansion of the Bag-Diagram requested by the user. FIG. 9(d) shows an expansion of the Bag-as-Sequence-Diagram requested by the user. FIG. 9(e) shows an expansion of the Bag-Seq-over-Linear-Order-Diagram requested by the user.

FIGS. 9(f)–9(i) show details of determination of the colimit of the hereditary diagram of FIG. 9(a). FIG. 9(f) shows a shape of the shape colimit, which is the shape that the colimit will eventually have. FIG. 9(g) shows an extension of the Bag-Diagram in accordance with the shape of the colimit. FIG. 9(h) shows an extension of the Bag-as-Sequence-Diagram in accordance with the shape of the colimit. FIG. 9(i) shows an extension of the Bag-Seq-over-Linear-Order-Diagram in accordance with the shape of the colimit. FIG. 9(j) shows an expanded version of Diagram-5, which is the colimit of the hereditary diagram. Note that the colimit has the shape of the diagram of FIG. 9(f).

A Preferred Implementation of the Colimit Operation for Hereditary Diagrams

Figure 10:
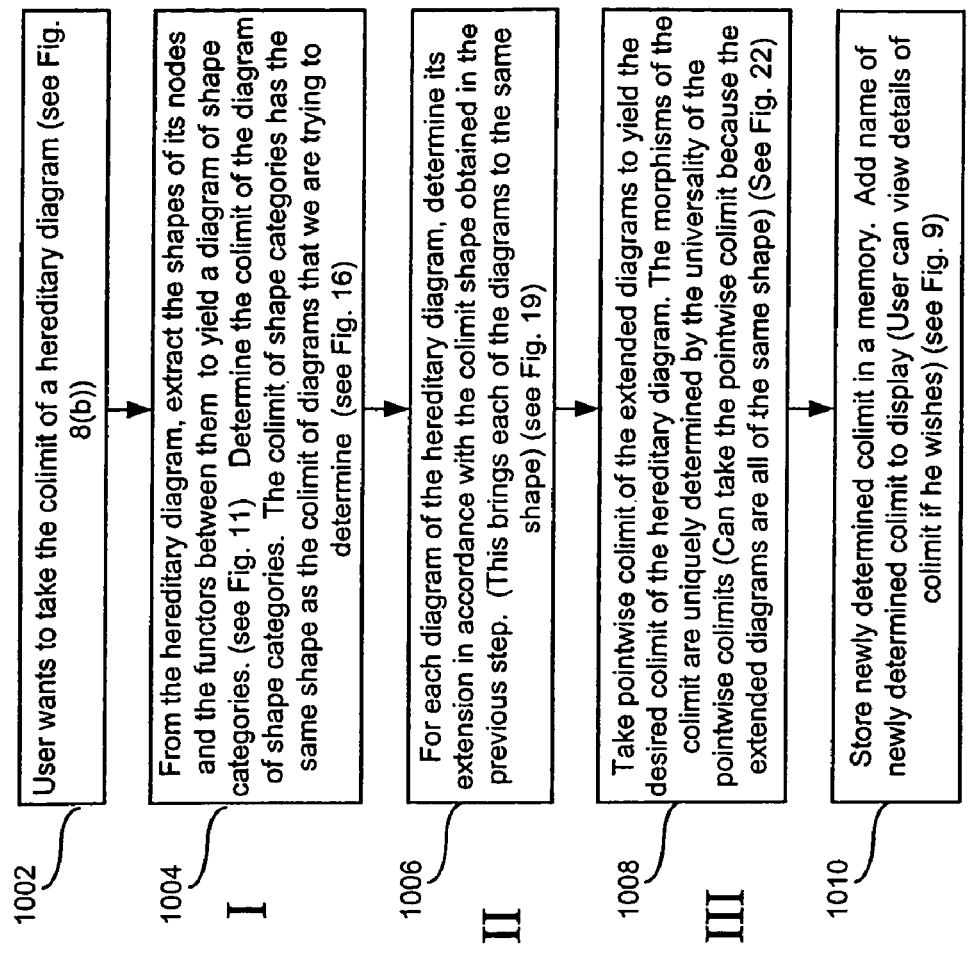
FIG. 10 is a flow chart of a method performed by the exemplary specification software to determine a colimit of a hereditary diagram.
Figure 11:
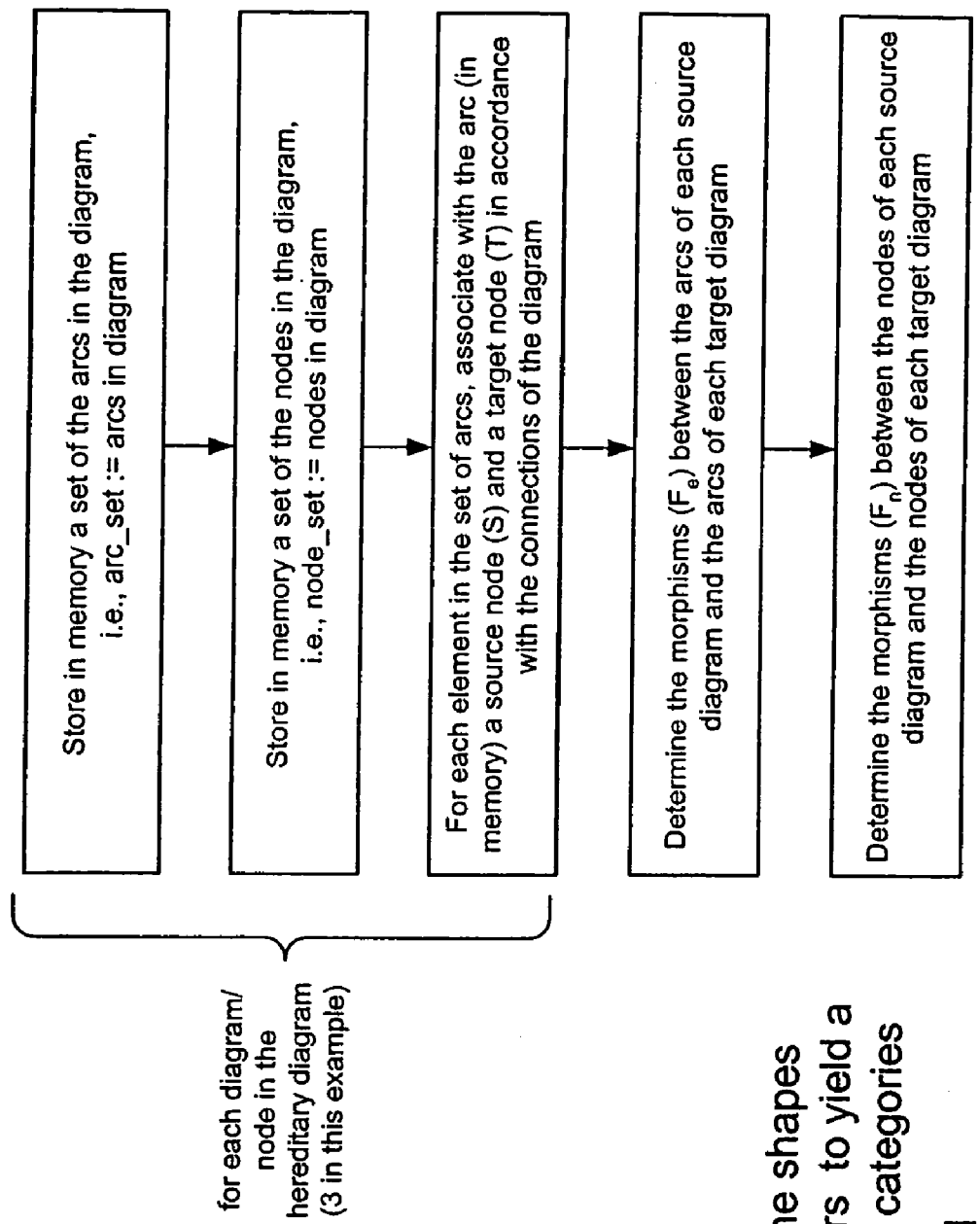
FIG. 11 is a flow chart showing a first part of the method of FIG. 10 to determine a diagram of shape categories.

FIG. 10 is a flow chart of a method preferably performed by the specification software 110 to determine a colimit of a hereditary diagram. In element 1002, the user indicates that he wants to take the colimit of a hereditary diagram. An example of a GUI to accomplish this indication is shown in FIG. 8(b). When software 110 receives such an indication from the user, software 110 preferably performs the remaining elements of FIG. 10. In element 1004, software 110 extracts the shapes of the nodes and functors of the hereditary diagram to yield a diagram of shape categories. Details of this element are shown in FIG. 11. Once a diagram of shape categories has been determined, software 110 determines, in element 1004, a colimit of the diagram of shape categories, as discussed below in connection with FIG. 16.

Software 110 then in element 1006 determines an extension of each diagram in the hereditary diagram in accordance with the shape colimit, as is discussed below in connection with FIG. 19. Extending each diagram in the hereditary diagram brings all diagrams in the hereditary diagram to the same shape, so that it is possible to take the pointwise colimit of the extended diagram. Then software 110 in element 1008 determines the colimit of the hereditary diagram using the extended diagrams, as discussed below in connection with FIG. 22. Once the colimit is determined, it can be stored in memory, saved, or displayed, as the user decides.

The following discussion of a preferred software program uses certain abstract concepts, which are presented in Table 1, which forms a part of this specification.

I. Determining a Shape Colimit

FIG. 11 is a flow chart showing a first part of the method of FIG. 10 to determine a diagram of shape categories. The elements of FIG. 11 are performed for each diagram in the hereditary diagram.

Figures 12A, 12B:
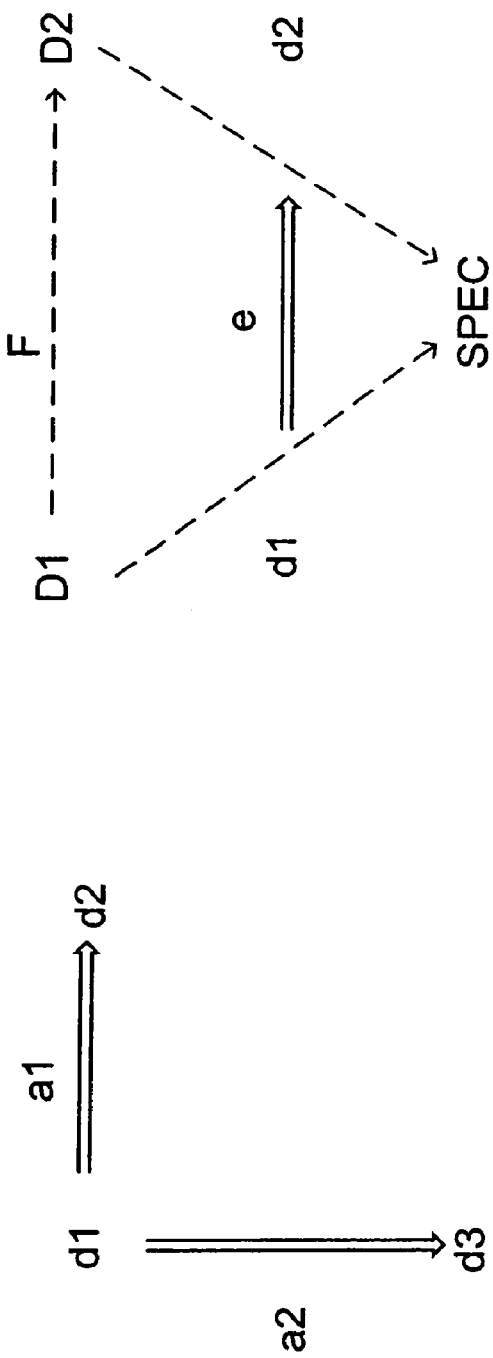
FIGS. 12(a) and 12(b) provide an example of a hereditary diagram.

First, hereditary diagrams will be discussed. FIG. 12(a) shows a high-level example of a hereditary diagram having three nodes d1, d2, d3 (each of which is a diagram) and two arcs a1 and a2 (also called "arrows" or "edges"). Each of arcs a1 and a2 represents a shape morphism between a pair of diagrams in the hereditary diagram. FIG. 12(b) shows a representation of a shape morphism from d1 to d2, where F is a shape functor and e is a natural transformation from d1 to (d2 composed with F). D1 and D2 are shape categories of respective diagrams d1 and d2 and SPEC is the category SPEC.

In the described embodiment, the user must specify shape morphisms between diagrams when the diagrams are created. Alternative embodiments determine this mapping heuristically by, for example, counting the number of arcs in and out of nodes or by looking at the type of the nodes.

Figure 13:
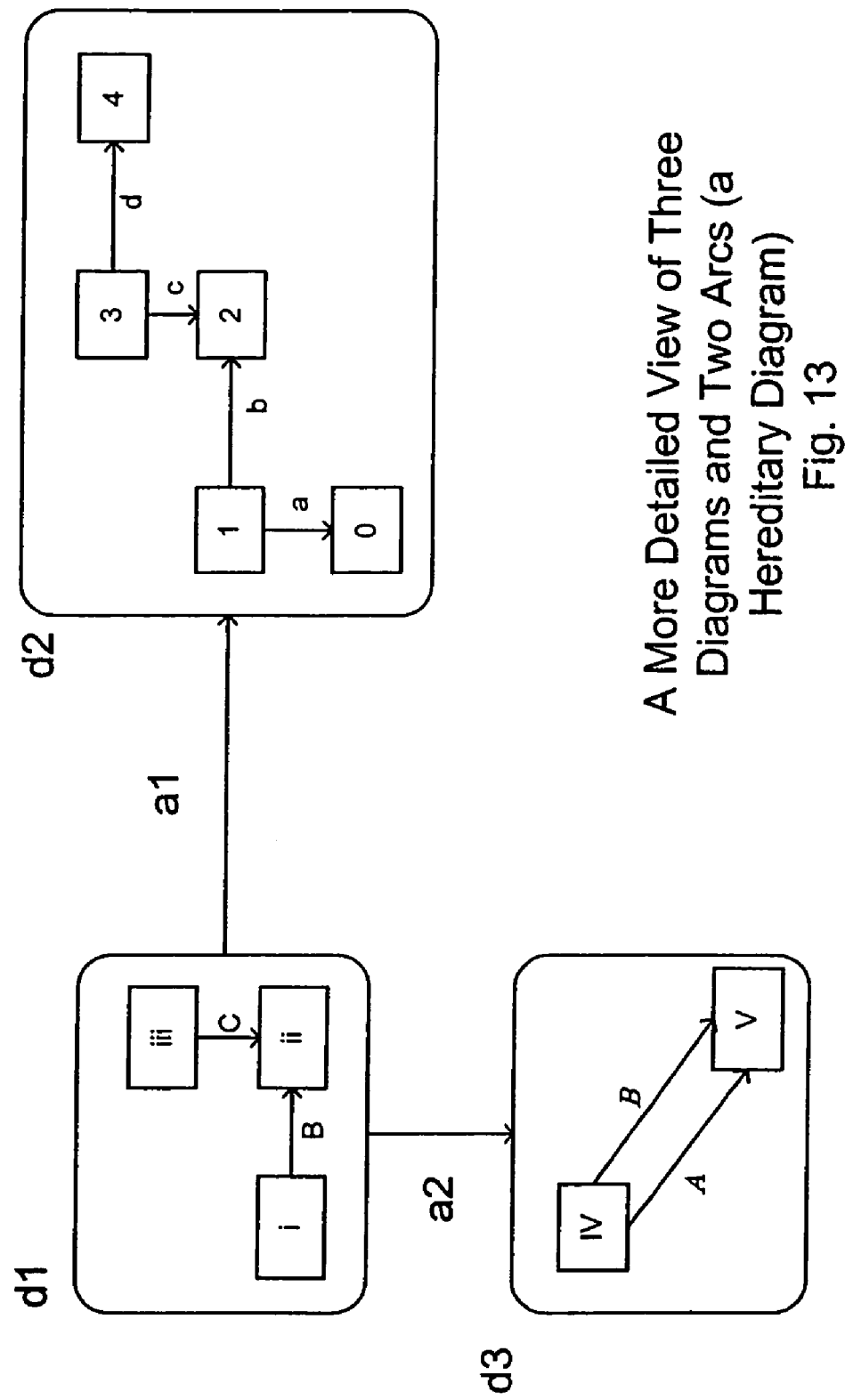
FIG. 13 provides a more detailed example of the hereditary diagram of FIG. 12.

FIG. 13 provides a more detailed example of the hereditary diagram of FIG. 12. Here, d1 is defined as having three nodes (i, ii, and iii) and two arcs (B and C). Diagram d2 is defined as having five nodes (0, 1, 2, 3, and 4) and four arcs (a, b, c, and d). Diagram d3 is defined as having two nodes (IV and V) and two arcs (A and B).

Figures 14, 15A:
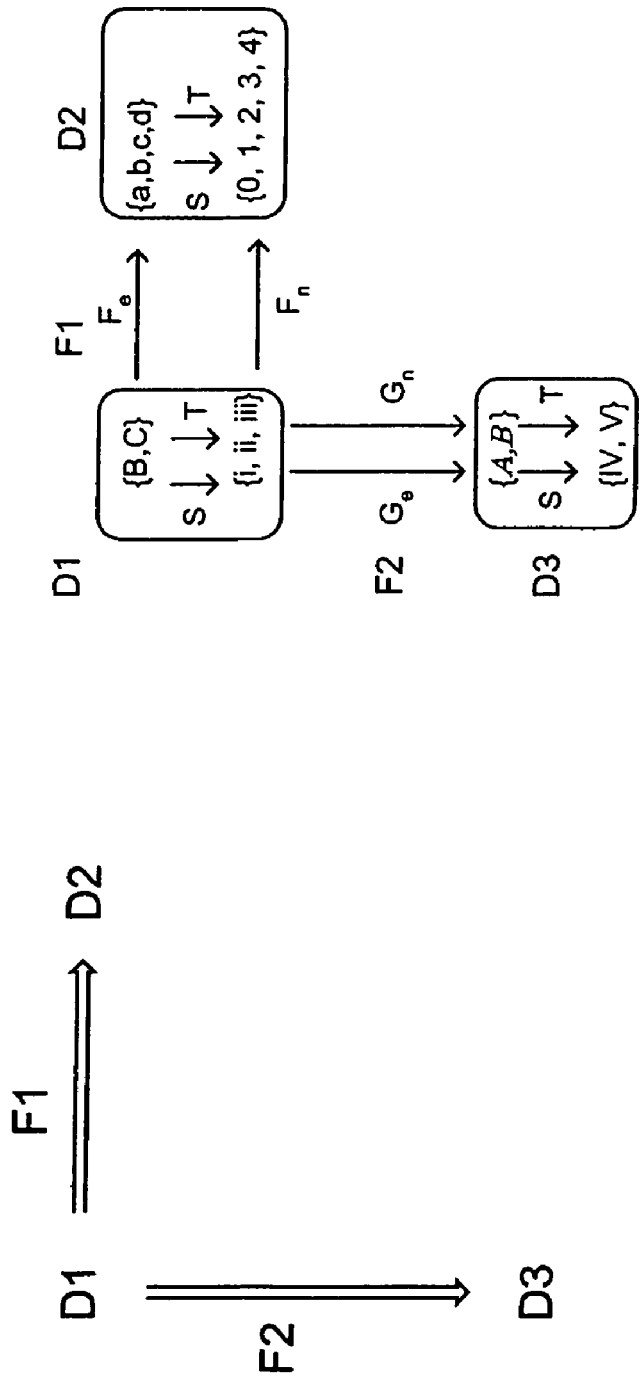

As shown in element 104 of FIG. 10, software 110 determines diagrams of shape categories. FIG. 14 provides an example of a diagram of shape categories for the hereditary diagram of FIG. 13. Diagrams D1, D2, and D3 represent the respective shapes of d1, d2, and d3. Functions $F_e$ and $F_n$ provide a mapping between the arcs (edges) and nodes of each pair of shape diagrams.

FIGS. 15(a)–15(d) provide a more detailed example of the diagram of FIG. 14. Mapping F1 between D1 and D2 is shown in FIG. 15(b). Mapping between D1 and D3 is shown in FIG. 15(c). Source nodes and targets nodes for arcs of the hereditary diagram are shown in FIG. 15(d).

Figure 16:
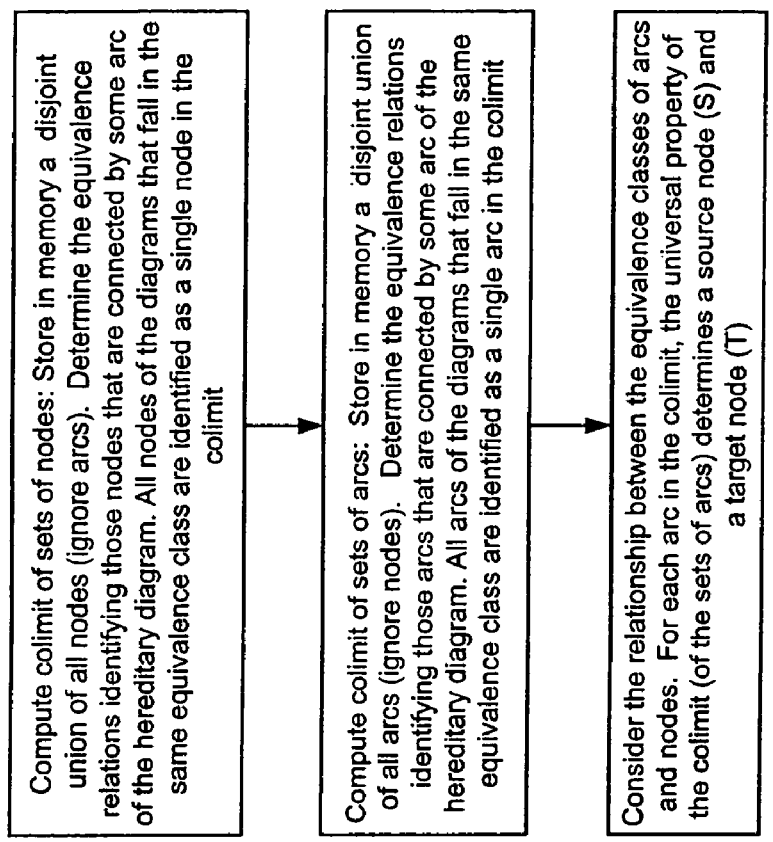
FIG. 16 is a flow chart showing additional portions of a first part of the method of FIG. 10 to determine a colimit of a diagram of shape categories.

FIG. 16 is a flow chart showing additional portions of a first part of the method of FIG. 10 to determine a colimit of a diagram of shape categories. A first element computes a colimit of the sets of nodes in the hereditary diagram. To do this, the software performs the following: Store in memory a disjoint union of all nodes (ignore arcs). Determine the equivalence relations identifying those nodes that are connected by some arc of the hereditary diagram. All nodes of the diagrams that fall in the same equivalence class are identified as a single node in the colimit. A similar element is performed to determine the colimit of the arcs. The software then considers the relationships between the equivalence classes of arcs and of nodes. For each arc in the colimit, the universal property (of the sets of arcs) determines a source node and a target node in the colimit.

FIG. 17 provides an example of a colimit D4 of a diagram of shape categories. As can be seen, several of the nodes of the colimit are created by combining nodes in the diagrams. FIGS. 18(a)–18(f) provide a more detailed example of the colimit of FIG. 17. The combined nodes have been determined to belong to the same equivalence class. For example, nodes 0 or 4 of diagram D3 do not map to any nodes of D1 or D3. Thus, these nodes are not grouped. Arcs b, B, A and arcs c, C, B are grouped, as are nodes 1,3, i, iii, IV 2, ii, V. As shown in FIG. 13, the grouped nodes and arcs belong to the same equivalence classes.

FIGS. 18(d)–18(f) show details of the mappings F3, F4, and F5 between the arcs and nodes or the diagrams in the hereditary diagram and D4.

II. Extending the Diagrams in Accordance with the Shape Colimit

In the previous section, we showed how to compute the shape of the colimit diagram. In this step we describe the method for computing the extension of a diagram along a shape morphism. The following paragraphs provide a short overview.

Let m:S->A be a diagram and let T be the shape of the desired diagram, where f:S->T is a shape morphism. The Extension method computes a diagram E(m,f):T –>A and a natural transformations eps:m –>f;n, with the universal property that for any k:T->A and natural transformation alph:m->f;k, there is a unique natural transformation sig: n->k such that alph factors through eps:alph=eps;(sig f) where ";" is used for vertical composition of natural transformations.

The method for computing the extension of diagram m along shape morphism f, denoted E(m,f), is.

(1) For each node t in T, we form its image under E(m,f) as follows:
form the shape f/t whose nodes are
  {<s,i>|i:f(s)->t is a path in T}
and whose arcs are
  {e|e:s->s' in S and f(e):f(s)->f(s') in B and <s,i> and <s',i'> are nodes}.
E(m,f)(t) is the (spec) colimit of the image of f/t under m.

(2) for each arc h:y->z in T, E(m,f)(h) is a unique morphism that witnesses the universality of the construction of E(m,f)(y). That is, h induces a functor from f/y to f/z and thus a diagram morphism dm: m(f/y)->m(f/z). The composition of dm with the cocone morphisms from m(f/z) to E(m,f)(z) forms a cocone on m(f/y), so E(m,f)(h) is the unique arrow from E(m,f)(y) to E(m,f)(z) that factors the cocone arrows.

We have the following property of E:
Theorem: When T is acyclic, then colimit(m) is isomorphic to colimit(E(m,f)).
This theorem asserts that we are neither gaining nor losing information in computing the extension of a diagram along a shape morphism. We are simply changing its shape.

The colimit of diagrams enables the automated application of design theories to requirement specifications. Knowledge about various kinds of software design knowledge (such as algorithm design principles, datatype refinements, software architectures, and program optimization techniques), and other forms of design knowledge, may be represented by refinement morphisms from a diagram of the general abstract structure A required for applicability of the design knowledge, and an abstract specification diagram of a design artifact B. Such a refinement morphism m:A->B is applied to a requirement diagram R by first constructing a "classification" morphism c:A->R, and then computing the (diagram) colimit R'. The cocone morphism cm:R->R' is a refinement of R that embodies the design knowledge in m.

FIG. 19 is a flow chart showing a second part of the method of FIG. 10 to extend a diagram in the hereditary diagram in accordance with the colimit of the shape diagram. The elements of FIG. 19 are performed for each diagram in the hereditary diagram so that each diagram yields an extended diagram. To extend one diagram, the following acts are performed. For each node in colimit D4, determine a node in the extended diagram. Thus, the extended diagram will have the same number of nodes as the shape colimit D4. The following are performed for each node n in D4: Find the nodes s in the shape diagram (for example D1) that have a path i to the node n. This yields a set of pairs of nodes s and paths i: {<s,i>, where I is a path from F(s) to node n in D4). F(s) is the node in D4 that corresponds to node(s) in D1.

For each two pairs in the set (for example, for <$s_i$,i> and <$s_j$,j>, find a path e between nodes si and sj. Because $s_i$ and $s_j$ have been determined to point to the same node, such a path must exist. Once each path e has been found between each pair in the set, make a graph of all the <s,i> pairs and take the colimit of the graph. This colimit forms one node in the extended diagram. Each arc in the extended diagram is uniquely defined and determined using the universality of the colimits for the nodes in the extended diagram.

Figure 20:
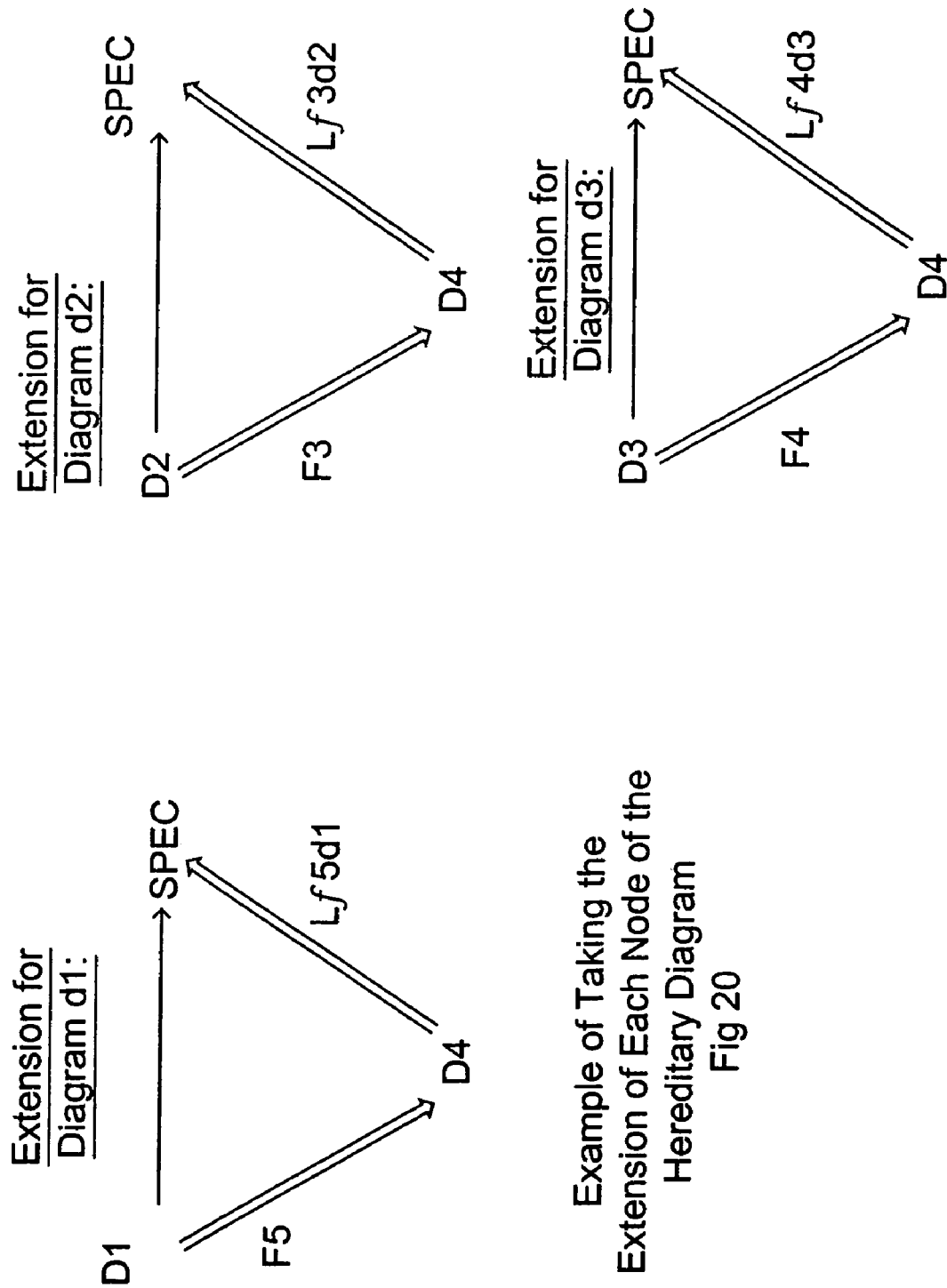
FIG. 20 provides examples of extended diagrams.

FIG. 20 provides examples of three extended diagrams. The notation, for example, Lf5d1 represents the extension of diagram D1.

Figure 21A:
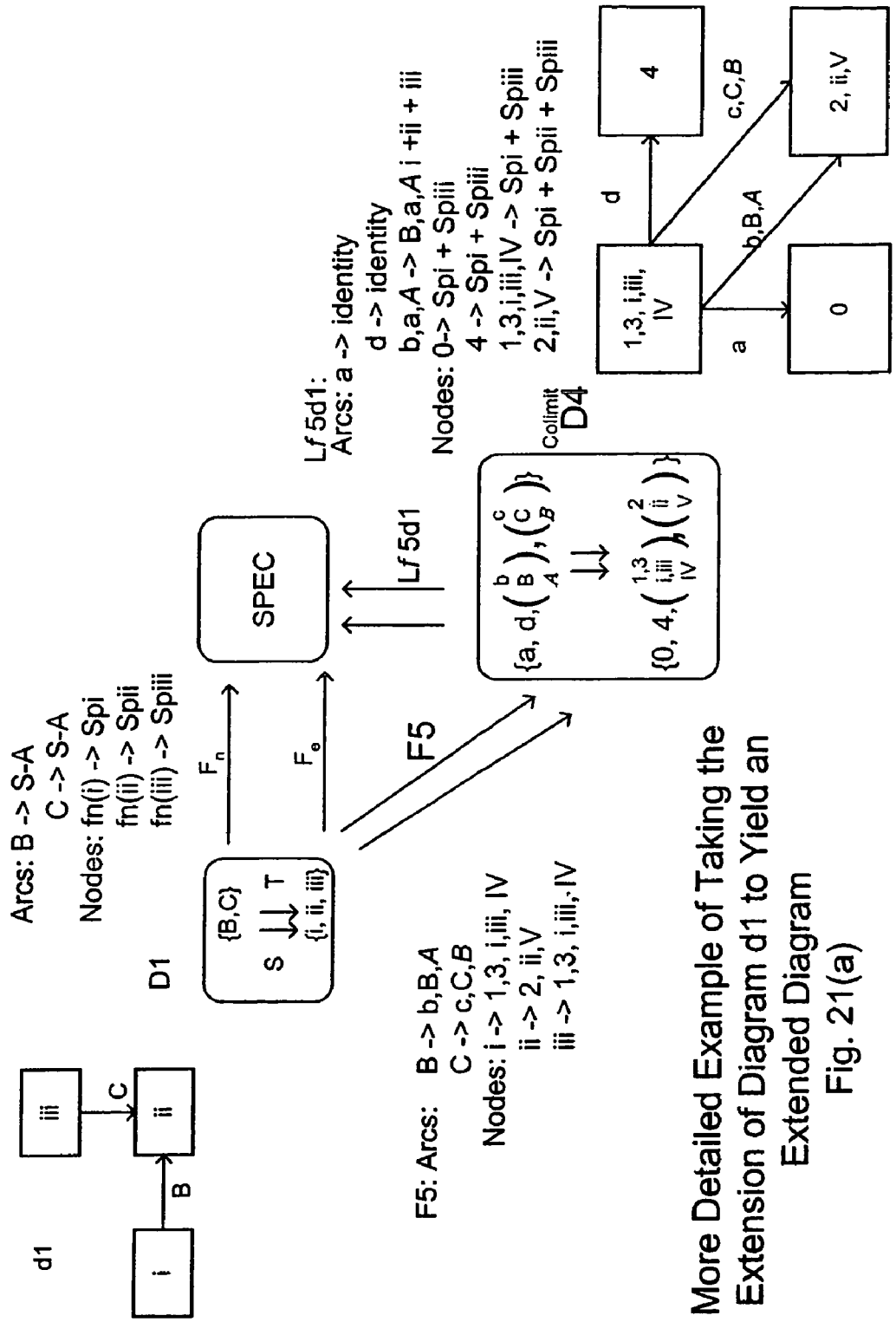

FIGS. 21(a)–21(f) provide a more detailed example of an extended diagram. FIG. 21(a) shows details of D1 and D4 and of the mapping F5, the mapping Lf5d1 and of the mapping between D1 and the extended diagram. The other extended diagrams are determined similarly. FIG. 21(b) shows an example of finding the nodes of the extended diagram. In FIG. 21(b), the method of FIG. 19 is performed for each node in D4, yielding a colimit that is the extension of the diagram D1. FIG. 21(c) shows an example of determining the arcs of the extension for two of the arcs of D4. In the example, arcs d and (CcB) are similar, due to the example chosen.

FIG. 21(d) shows examples of specs/nodes and arcs that have been predefined by the user. These specs are used is the mapping between D1 and SPEC in FIG. 21(a). Similarly, the arcs are the arcs used in the same mapping.

FIGS. 21(e) and 21(f) are examples of using the specs of FIG. 21(d) to compose several specs that will form the nodes of the extended diagram. Note that in FIG. 12(a), the nodes and arcs of the extension are defined as mapping Lf5d1. FIG. 21(e) implements the compositions of this mapping.

III. Determining a Pointwise Colimit of the Extended Diagrams

FIG. 22 is a flow chart showing a beginning of a third part of the method of FIG. 10.

FIG. 23 provides an example of the extended diagrams 2300, 2302, 2304, which will be used to determine the colimit of the extended diagrams.

Figure 25:
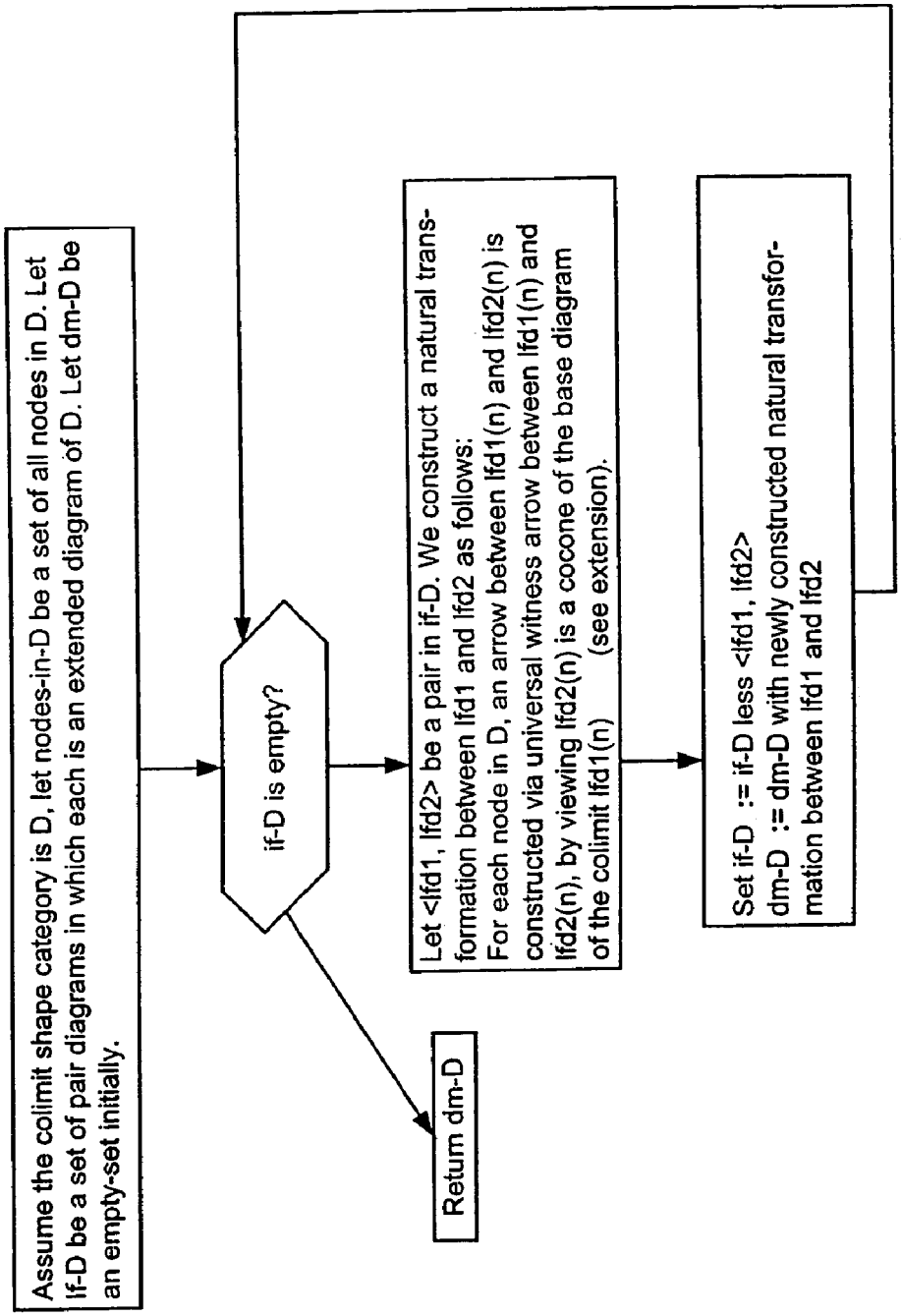
Figure 26:
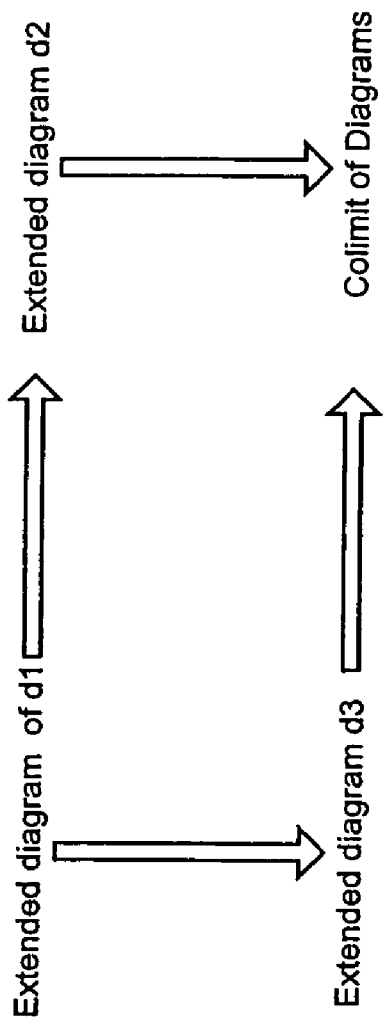

FIGS. 24–26 provide a more detailed example of taking a pointwise colimit of extended diagrams to yield a colimit of the original hereditary diagram.

Figure 28:
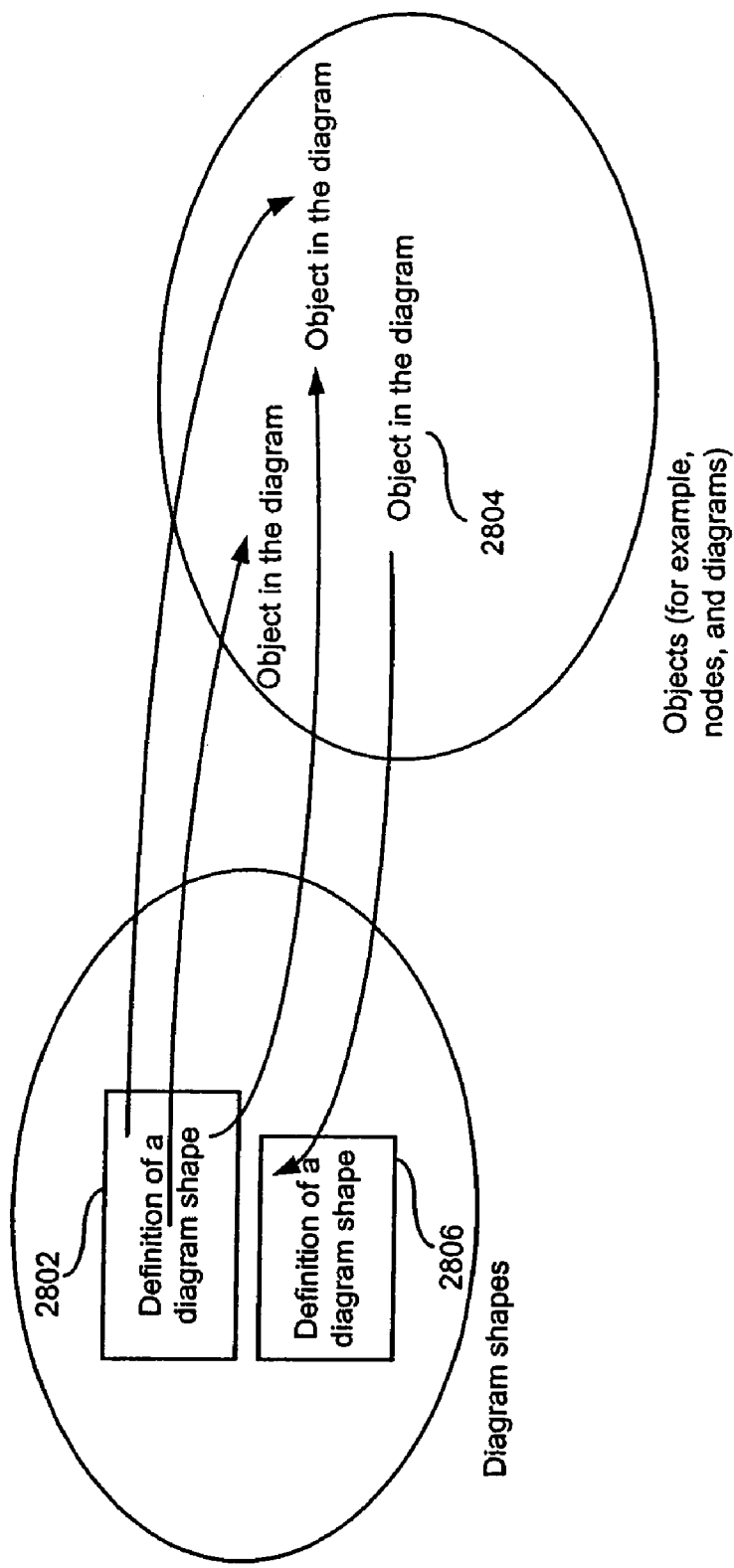
FIG. 28 shows example data structures used in a preferred embodiment.

FIG. 27 shows example data structures used in a preferred embodiment. FIG. 28 shows a conceptual representation of object-oriented data structures. As can be seen from the diagram, a hereditary diagram 2802 includes a plurality of objects, at least one of which 2804 is itself a diagram 2806. The details of diagram 2806 are not shown for the sake of clarity. Of course, diagram 2806 could also be a hereditary diagram. It will be understood that, although the present implementation uses an object oriented programming language, any appropriate implementation method can be used. From the above description, it will be apparent that the invention disclosed herein provides a novel and advantageous system and method of determining colimits of hereditary diagrams.

What is claimed is:

1. A computer-implemented method of automated software specification, comprising:
    storing specification modules, with their relations displayed on a computer screen in terms of their specification morphisms, where the specification morphisms translate the specification signatures while preserving the logical structure of the specification;
    determining and displaying, in response to a user command, multiple specification diagrams, each of which captures the relation between two or more specification modules, along with its specification morphisms;
    building and displaying, in response to a user command, a diagram of the specification diagrams, the diagram of specification diagrams retaining the diagram morphisms of the specification diagrams; and computing the colimits of the hereditary diagram of diagrams to compose large software modules while preserving the decomposition of the involved components.

2. The computer-implemented method of claim 1, wherein computing the colimits of the hereditary diagram of diagrams comprises:

extracting the shape colimit of the hereditary diagram stored in a memory, the hereditary diagram including a plurality of diagrams;

bringing each of the plurality of diagrams in the hereditary diagram to the shape of the shape colimit to yield a plurality of extended diagrams in the memory; and taking the colimit of the extended diagrams.

3. The method of claim 1, further comprising: receiving from the user an indication to find the colimit of the hereditary diagram.

4. The method of claim 2, wherein extracting the shape colimit of the hereditary diagram includes:

determining the shape of each of the plurality of diagrams to yield a shape graph in the memory; and automatically calculating a colimit of the shape diagram.

5. The method of claim 1, further comprising: displaying a representation of the colimit on a display device.

6. The method of claim 5, wherein the representation o the colimit is the name of the colimit.

7. The method of claim 5, wherein the representation of the colimit is a picture of the diagram of the colimit.

8. The method of claim 1, wherein the hereditary diagram includes types of the diagram elements.

9. The method of claim 1, wherein the hereditary diagram includes morphisms between the diagram elements.

10. The method of claim 1, wherein the hereditary diagram is displayed with indicators on its arcs indicating what morphism is associated with the arcs.

11. The method of claim 1, wherein the colimit of the hereditary diagram is displayed with indicators on its arcs indicating that arcs constitute a cocone colimit.

12. A computer-implemented system of automated software specification stored on a computer readable medium, comprising:

specification modules stored as separate entities, with their relations displayed on a computer screen in terms of their specification morphisms, where the specification morphisms translate the specification signatures while preserving the logical structure of the specification;

a portion that determines and displays, in response to a user command, multiple specification diagrams, each of which captures the relation between two or more specification modules, along with its specification morphisms;

a portion that builds and displays, in response to a user command, a diagram of the specification diagrams, the diagram of specification diagrams retaining the diagram morphisms of the specification diagrams; and a portion that computes the colimits of the hereditary diagram of diagrams to compose large software modules while preserving the decomposition of the involved components.

* * * * *